(12) United States Patent
Hattori et al.

(10) Patent No.: US 9,738,157 B1
(45) Date of Patent: Aug. 22, 2017

(54) DECORATIVE PART FOR VEHICLE DISPLAY DEVICE AND VEHICLE DISPLAY DEVICE

(71) Applicant: Yazaki Corporation, Tokyo (JP)

(72) Inventors: Tatsuya Hattori, Shizuoka (JP); Teruomi Sano, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/433,341

(22) Filed: Feb. 15, 2017

(30) Foreign Application Priority Data

Feb. 16, 2016 (JP) ................... 2016-026769

(51) Int. Cl.
*B60K 35/00* (2006.01)
*G02B 5/08* (2006.01)
*B60K 37/02* (2006.01)

(52) U.S. Cl.
CPC .............. *B60K 35/00* (2013.01); *B60K 37/02* (2013.01); *G02B 5/0808* (2013.01); *B60K 2350/20* (2013.01); *B60K 2350/402* (2013.01)

(58) Field of Classification Search
CPC .... B60K 35/00; B60K 37/02; B60K 2350/20; B60K 2350/402; G02B 5/0808
USPC ................................ 359/868, 883
See application file for complete search history.

(56) References Cited

U.S. PATENT DOCUMENTS

2002/0189526 A1* 12/2002 Sugimoto .............. B60K 37/02
116/286
2008/0123322 A1* 5/2008 Tane ...................... B60K 35/00
362/23.01
2008/0158852 A1* 7/2008 Fukushima ............ B60K 35/00
362/19
2011/0163864 A1* 7/2011 Watanabe .............. B60K 35/00
340/441
2013/0087092 A1* 4/2013 Hashimoto ............ G01D 11/28
116/286
2015/0379773 A1* 12/2015 Konishi ................. B60Q 3/044
345/633
2016/0238418 A1* 8/2016 Fujita ..................... B60K 37/02
2016/0252373 A1* 9/2016 Fujita ..................... G01D 13/04
2016/0368381 A1* 12/2016 Ogawa ................... B60K 35/00
2017/0106628 A1* 4/2017 Hattori ................... B32B 15/08
2017/0106810 A1* 4/2017 Hattori ................... B60K 35/00

FOREIGN PATENT DOCUMENTS

JP        2007-232403 A     9/2007
JP        2015-100933    *  6/2015

* cited by examiner

*Primary Examiner* — Ricky D Shafer
(74) *Attorney, Agent, or Firm* — Sugrue Mion, PLLC

(57) ABSTRACT

A decorative part for a vehicle display device includes a substrate body that is molded by synthetic resin and a mirror surface that is formed on a surface of the substrate body, in which the mirror surface is formed so that mirror surface roughness becomes larger than 0 and equal to or smaller than 0.35 μm and a ratio of a wavelength becomes equal to or larger than 1:600 and equal to or smaller than 1:6000 in the case of an amplitude of 1, the amplitude being captured by a ratio of the amplitude corresponding to an average height of an undulation waveform and the wavelength corresponding to an average length of the undulation waveform in an undulation curve in which a cutoff value from a surface shape is 250 μm.

6 Claims, 12 Drawing Sheets

STANDARD LENGTH

FIG.18

| | FIRST COMPARATIVE EXAMPLE | SECOND COMPARATIVE EXAMPLE | THIRD COMPARATIVE EXAMPLE | FOURTH COMPARATIVE EXAMPLE | FIRST REFERENCE EXAMPLE | SECOND REFERENCE EXAMPLE | PRESENT METAL |
|---|---|---|---|---|---|---|---|
| UNDULATION Wc: Wsm | 1:181 | 1:482 | 1:524 | 1:556 | 1:659 | 1:1460 TO 2920 | 1:2560 TO 5850 |
| MIRROR SURFACE ROUGHNESS Ra (μm) | 1.714 | 1.271 | 0.696 | 0.368 | 0.336 | 0.296 | 0.259 |
| EVALUATION VALUE | 70 | 80 | 90 | 90 | 100 | 120 | — |

FIG.19

| | FIFTH COMPARATIVE EXAMPLE | SIXTH COMPARATIVE EXAMPLE | SEVENTH COMPARATIVE EXAMPLE | EIGHTH COMPARATIVE EXAMPLE | THIRD REFERENCE EXAMPLE | FOURTH REFERENCE EXAMPLE | PRESENT METAL |
|---|---|---|---|---|---|---|---|
| RIDGE LINE VERTEX ANGLE R (μm) | 262.5 OR LESS | 37.0 OR LESS | 36.7 OR LESS | 34.0 OR LESS | 27.6 OR LESS | 6.7 OR LESS | 0 |
| EVALUATION VALUE | 80 | 90 | 90 | 90 | 100 | 130 | — |

FIG.20

| | NINTH COMPARATIVE EXAMPLE | TENTH COMPARATIVE EXAMPLE | ELEVENTH COMPARATIVE EXAMPLE | FIFTH REFERENCE EXAMPLE | SIXTH REFERENCE EXAMPLE | PRESENT METAL |
|---|---|---|---|---|---|---|
| WIDTH W ($\mu$m) | 43.84 TO 199.3 | 0 TO 82.34 | 2.853 TO 75.93 | 0.331 TO 2.653 | 0.280 TO 1.439 | 0.337 TO 1.562 |
| HEIGHT H ($\mu$m) | 10.17 TO 18.07 | 0 TO 1.053 | 0.225 TO 1.195 | 0.007 TO 0.316 | 0.006 TO 0.310 | 0.007 TO 0.611 |
| EVALUATION VALUE | 80 | 85 | 90 | 110 | 120 | — |

FIG.21

| | TWELFTH COMPARATIVE EXAMPLE | SEVENTH REFERENCE EXAMPLE | EIGHTH REFERENCE EXAMPLE | NINTH REFERENCE EXAMPLE | TENTH REFERENCE EXAMPLE | PRESENT METAL |
|---|---|---|---|---|---|---|
| GROOVE VERTEX ANGLE R1 ($\mu$m) | 44.0 OR LESS | 38.0 OR LESS | 36.0 OR LESS | 33.0 OR LESS | 31.5 OR LESS | 0 |
| EVALUATION VALUE | 90 | 100 | 110 | 120 | 150 | — |

DECORATIVE PART FOR VEHICLE DISPLAY DEVICE AND VEHICLE DISPLAY DEVICE

CROSS-REFERENCE TO RELATED APPLICATION(S)

The present application claims priority to and incorporates by reference the entire contents of Japanese Patent Application No. 2016-026769 filed in Japan on Feb. 16, 2016.

BACKGROUND OF THE INVENTION

1. Field of the Invention

The present invention relates to a decorative part for a vehicle display device and a vehicle display device.

2. Description of the Related Art

As a conventional decorative part for a vehicle display device applied to a vehicle display device, for example, Japanese Patent Application Laid-open No. 2007-232403 discloses a decorative member for a vehicle instrument including a substrate which is formed of a translucent material and has a display design and a primer layer and a metal film which are sequentially laminated on a part excluding a front surface of the substrate and a front surface of the display design in a direction from the substrate.

Incidentally, the decorative member for the vehicle instrument disclosed in Japanese Patent Application Laid-open No. 2007-232403 has room for further improvement in that a luxurious feeling needs to be ensured.

SUMMARY OF THE INVENTION

The present invention has been made in view of the above-described circumstances and an object of the present invention is to provide a decorative part for a vehicle display device and a vehicle display device capable of appropriately ensuring a luxurious feeling for a viewer in a configuration in which a surface of a resinous substrate body is decorated.

In order to achieve the above mentioned object, a decorative part for a vehicle display device according to one aspect of the present invention includes a substrate body that is molded by black synthetic resin; and a mirror surface that is formed on a surface of the substrate body, wherein the mirror surface is formed so that mirror surface roughness becomes larger than 0 and equal to or smaller than 0.35 µm and a ratio of a wavelength becomes equal to or larger than 1:600 and equal to or smaller than 1:6000 in the case of an amplitude of 1, the amplitude being captured by a ratio of the amplitude corresponding to an average height of an undulation waveform and the wavelength corresponding to an average length of the undulation waveform in an undulation curve in which a cutoff value from a surface shape is 250 µm.

According to another aspect of the present invention, in the decorative part for the vehicle display device, it is possible to further include a ridge line that is formed by an intersection of different surfaces of the surface of the substrate body, wherein the ridge line is formed so that a curvature radius of a corner forming a vertex becomes larger than 0 and equal to or smaller than 28.0 µm.

In order to achieve the above mentioned object, a decorative part for a vehicle display device according to still another aspect of the present invention includes a substrate body that is molded by black synthetic resin; a mirror surface that is formed on a surface of the substrate body; and a plurality of grooves that are formed on the surface of the substrate body, wherein the mirror surface is formed so that mirror surface roughness becomes larger than 0 and equal to or smaller than 0.35 µm and a ratio of a wavelength becomes equal to or larger than 1:600 and equal to or smaller than 1:6000 in the case of an amplitude of 1, the amplitude being captured by a ratio of the amplitude corresponding to an average height of an undulation waveform and the wavelength corresponding to an average length of the undulation waveform in an undulation curve in which a cutoff value from a surface shape is 250 µm, and the plurality of grooves are formed so that a width between bottom points of the adjacent grooves becomes larger than 0 and equal to or smaller than 3.0 µm and a height of a vertex between the adjacent grooves at a lower side of the bottom points of the adjacent grooves becomes larger than 0 and equal to or smaller than 1.0 µm.

According to still another aspect of the present invention, in the decorative part for the vehicle display device, it is possible to further include a ridge line that is formed by an intersection of different surfaces of the surface of the substrate body, wherein the ridge line is formed so that a curvature radius of a corner forming a vertex becomes larger than 0 and equal to or smaller than 28.0 µm.

According to still another aspect of the present invention, in the decorative part for the vehicle display device, it is possible to configure that the plurality of grooves are formed so that a curvature radius of a corner forming the vertex between the adjacent grooves becomes larger than 0 and equal to or smaller than 38.0 µm.

In order to achieve the above mentioned object, a vehicle display device according to still another aspect of the present invention includes a display unit that displays information on a vehicle; and a decorative part for the vehicle display device that includes a substrate body molded by black synthetic resin and a mirror surface formed on a surface of the substrate body, wherein the mirror surface is formed so that mirror surface roughness becomes larger than 0 and equal to or smaller than 0.35 µm and a ratio of a wavelength becomes equal to or larger than 1:600 and equal to or smaller than 1:6000 in the case of an amplitude of 1, the amplitude being captured by a ratio of the amplitude corresponding to an average height of an undulation waveform and the wavelength corresponding to an average length of the undulation waveform in an undulation curve in which a cutoff value from a surface shape is 250 µm.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 18 is a diagram illustrating a result of a sensory evaluation test of a dial plate according to a reference example;

FIG. 19 is a diagram illustrating a result of a sensory evaluation test of a dial plate according to a reference example;

FIG. 20 is a diagram illustrating a result of a sensory evaluation test of a dial plate according to a reference example; and FIG. 21 is a diagram illustrating a result of a sensory evaluation test of a dial plate according to a reference example.

DETAILED DESCRIPTION OF THE PREFERRED EMBODIMENTS

Hereinafter, an embodiment of the present invention will be described in detail with reference to the drawings. Additionally, it should be noted that the present invention is not limited by this embodiment. In addition, components in the embodiment below include a component which can be easily replaced by those skilled in the art and a component which has substantially the same configuration.

Embodiment

Figure 1:
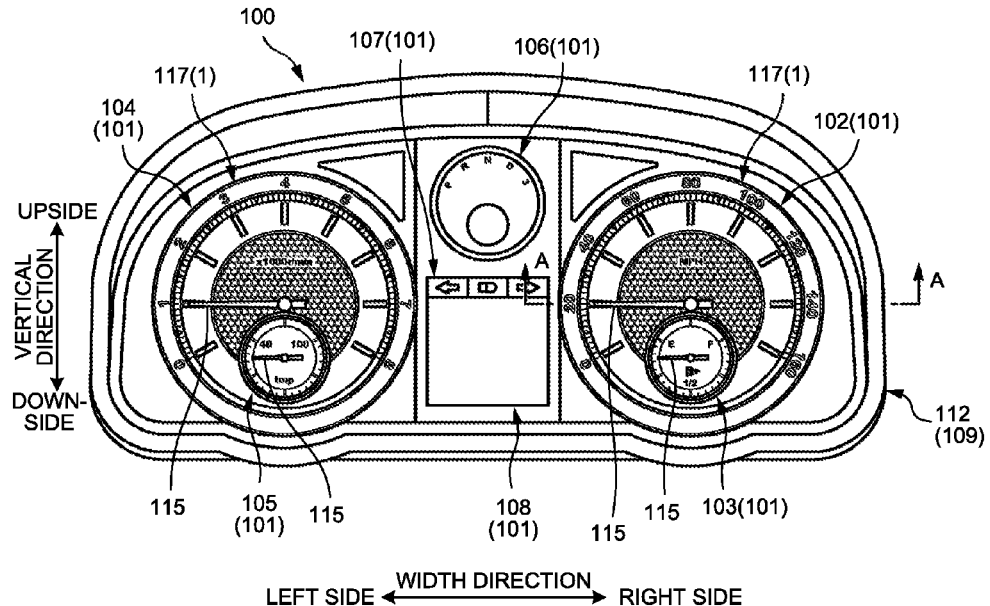
FIG. 1 is a front view illustrating a schematic configuration of a vehicle display device according to an embodiment.
Figure 2:
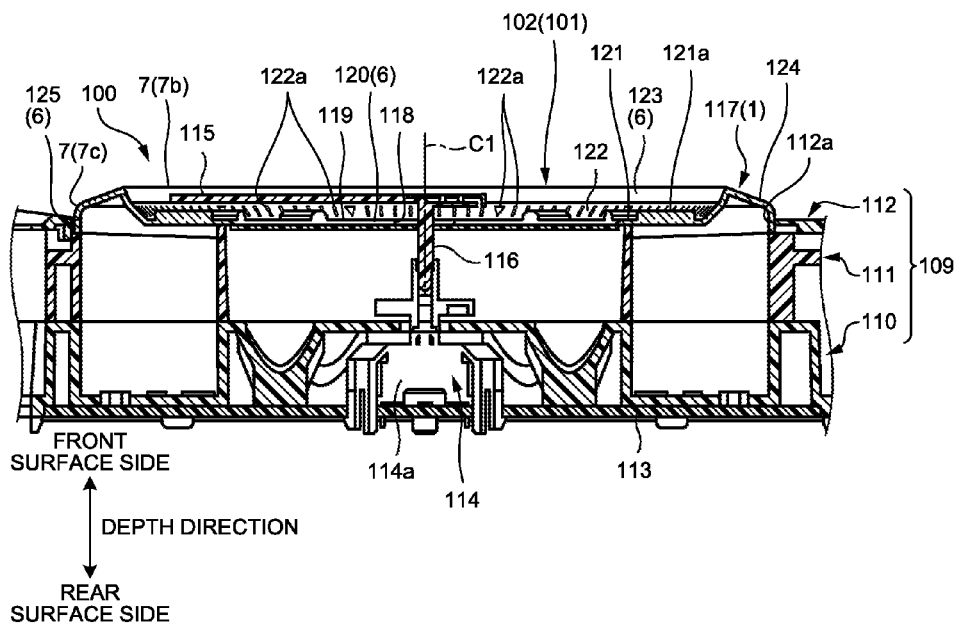
FIG. 2 is a cross-sectional view taken along a part A-A of FIG. 1.
Figure 3:
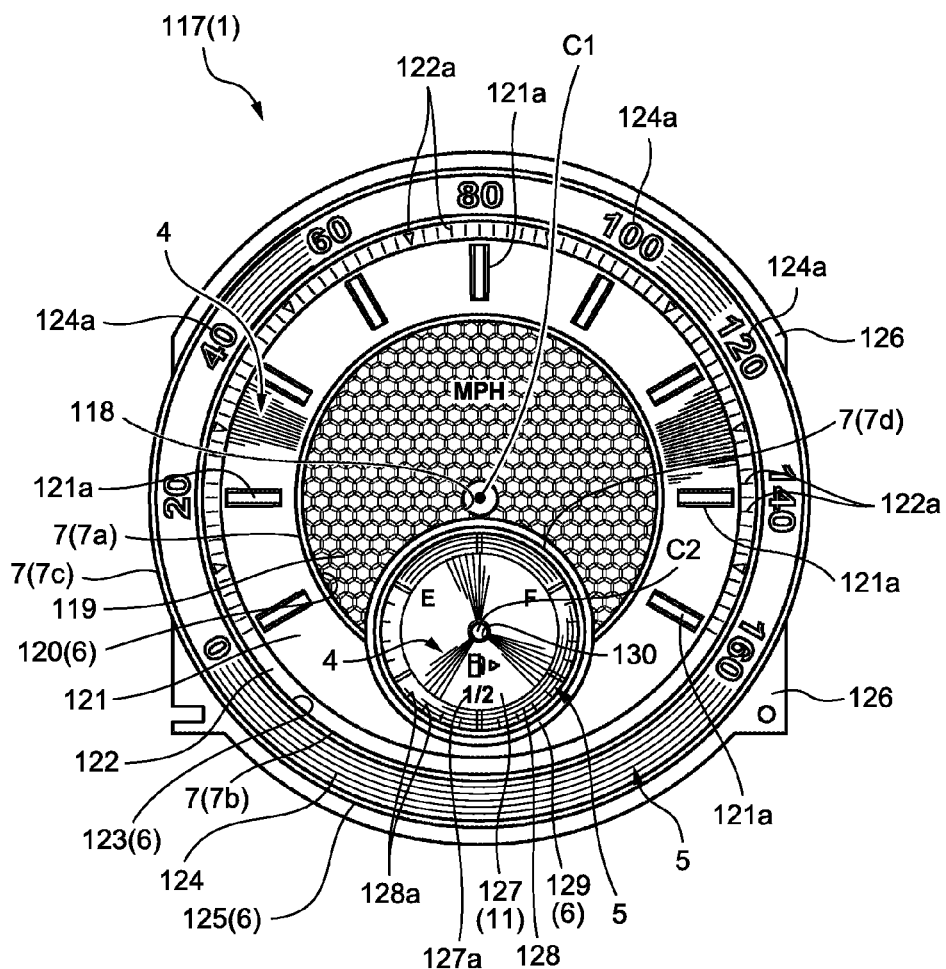
FIG. 3 is a front view illustrating a schematic configuration of a dial plate applied to the vehicle display device according to the embodiment.
Figure 4:
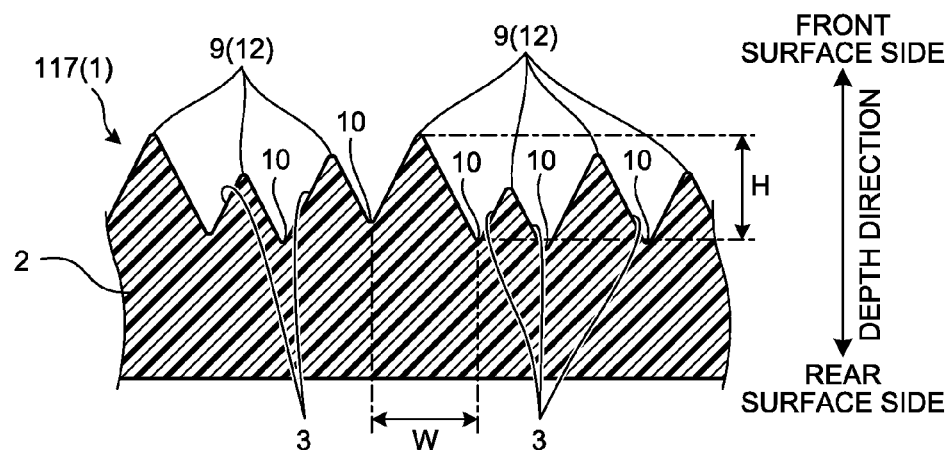
FIG. 4 is a schematic cross-sectional view illustrating a schematic configuration of the dial plate applied to the vehicle display device according to the embodiment.
Figure 5:
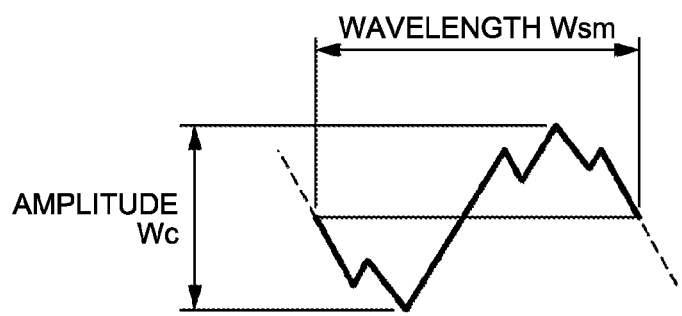
FIG. 5 is a schematic diagram illustrating an undulation waveform generated on a surface of a mirror surface.
Figure 6:
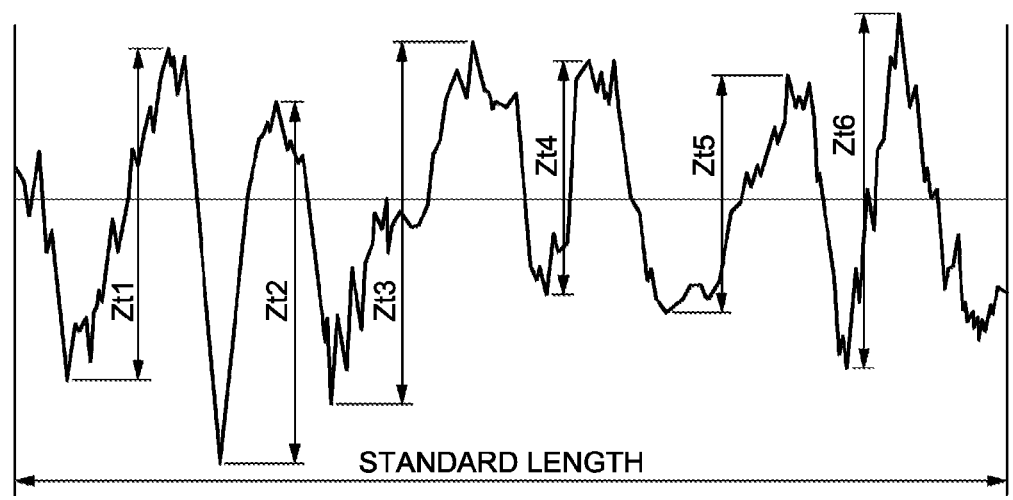
FIG. 6 is an explanatory diagram for obtaining an average height of an undulation curve.
Figure 7:
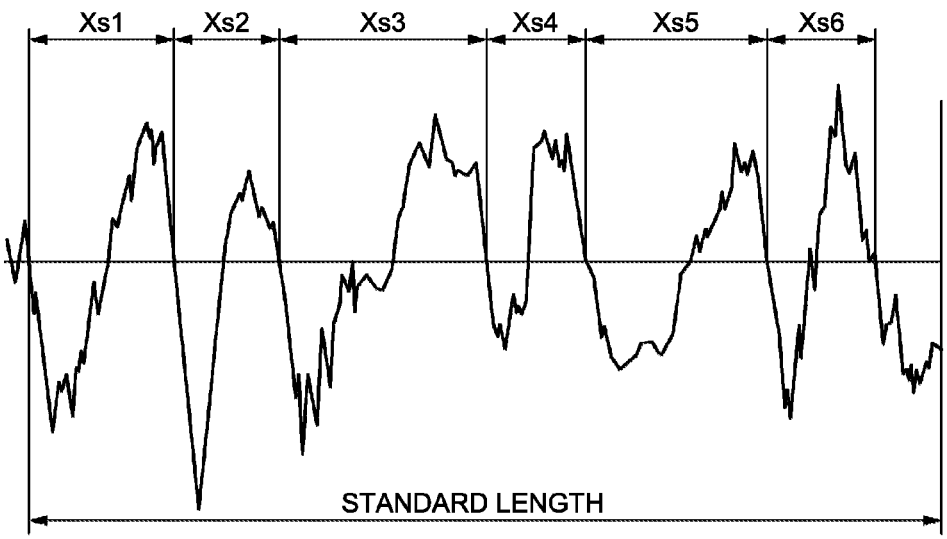
FIG. 7 is an explanatory diagram for obtaining an average length of the undulation curve.
Figure 8:
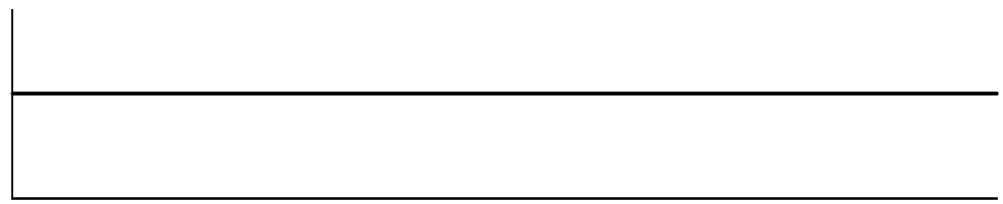
FIG. 8 is a line chart illustrating an example of measurement data of an undulation curve for the dial plate applied to the vehicle display device according to the embodiment.
Figure 9:
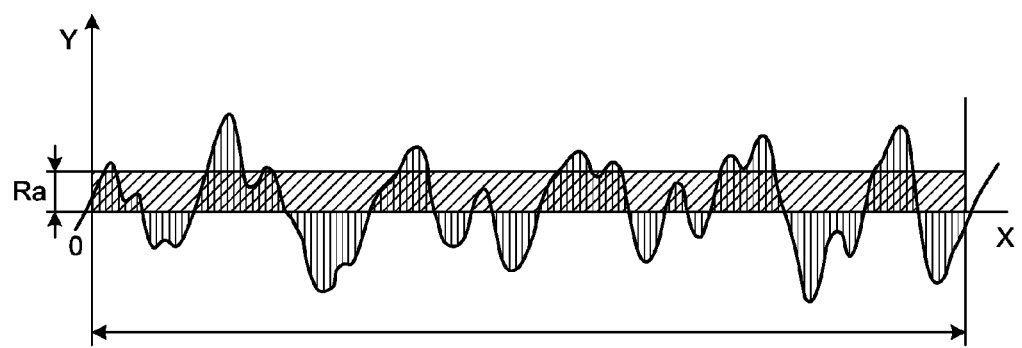
FIG. 9 is an explanatory diagram for obtaining arithmetic average roughness.
Figure 10:
FIG. 10 is a line chart illustrating an example of measurement data of a roughness curve for the dial plate applied to the vehicle display device according to the embodiment.
Figure 11:
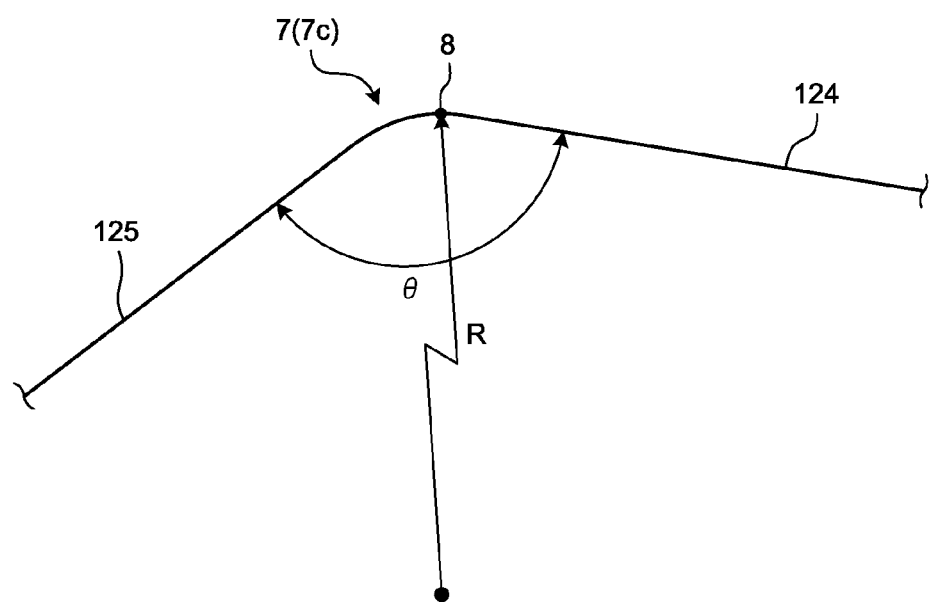
FIG. 11 is a schematic diagram illustrating a curvature radius of a corner forming a vertex of a groove of the dial plate applied to the vehicle display device according to the embodiment.
Figure 12:
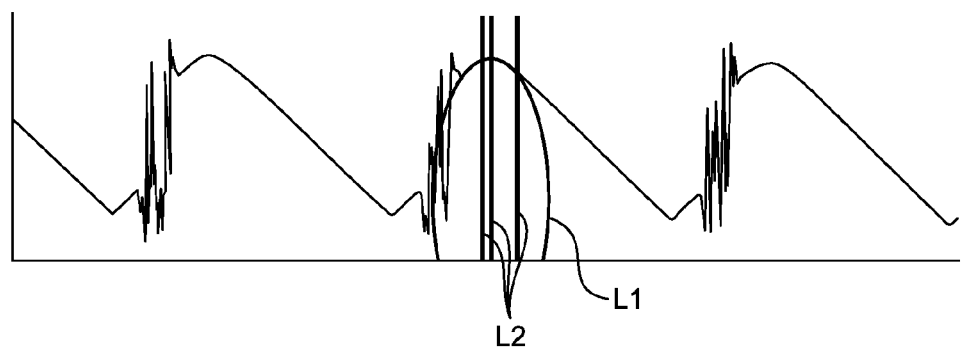
FIG. 12 is a line chart illustrating an example of measurement data for the dial plate applied to the vehicle display device according to the embodiment.
Figure 13:
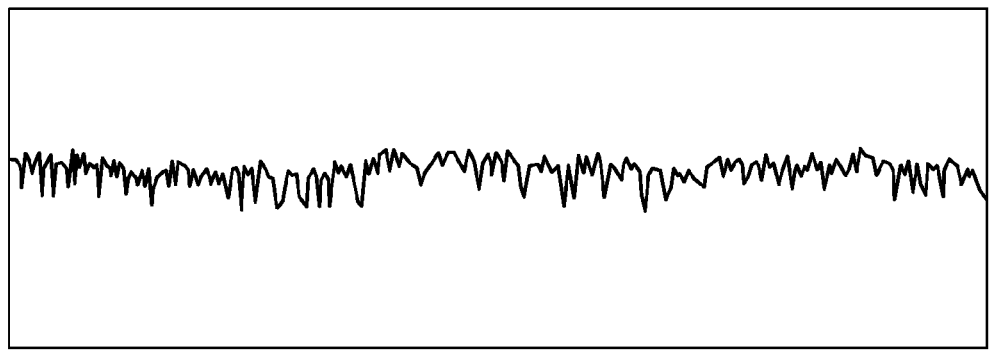
FIG. 13 is a line chart illustrating an example of measurement data of the dial plate applied to the vehicle display device according to the embodiment.
Figure 14:
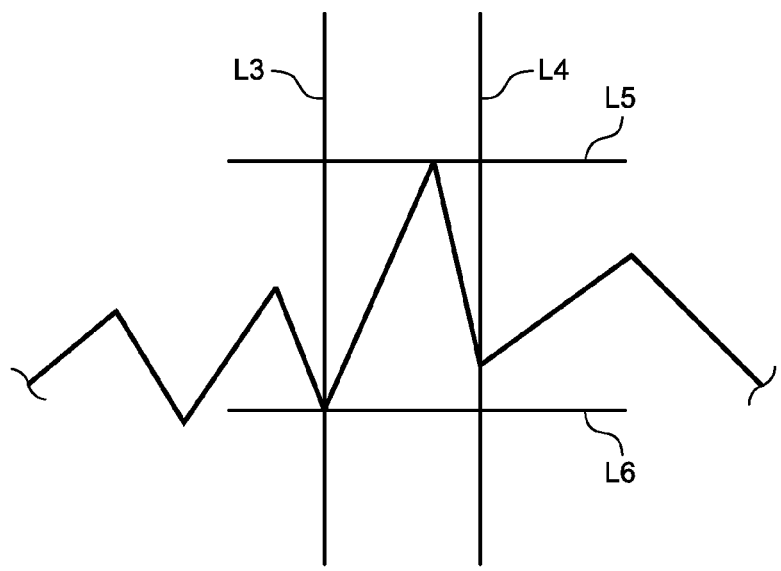
FIG. 14 is a line chart illustrating an example of measurement data of the dial plate applied to the vehicle display device according to the embodiment.
Figure 15:
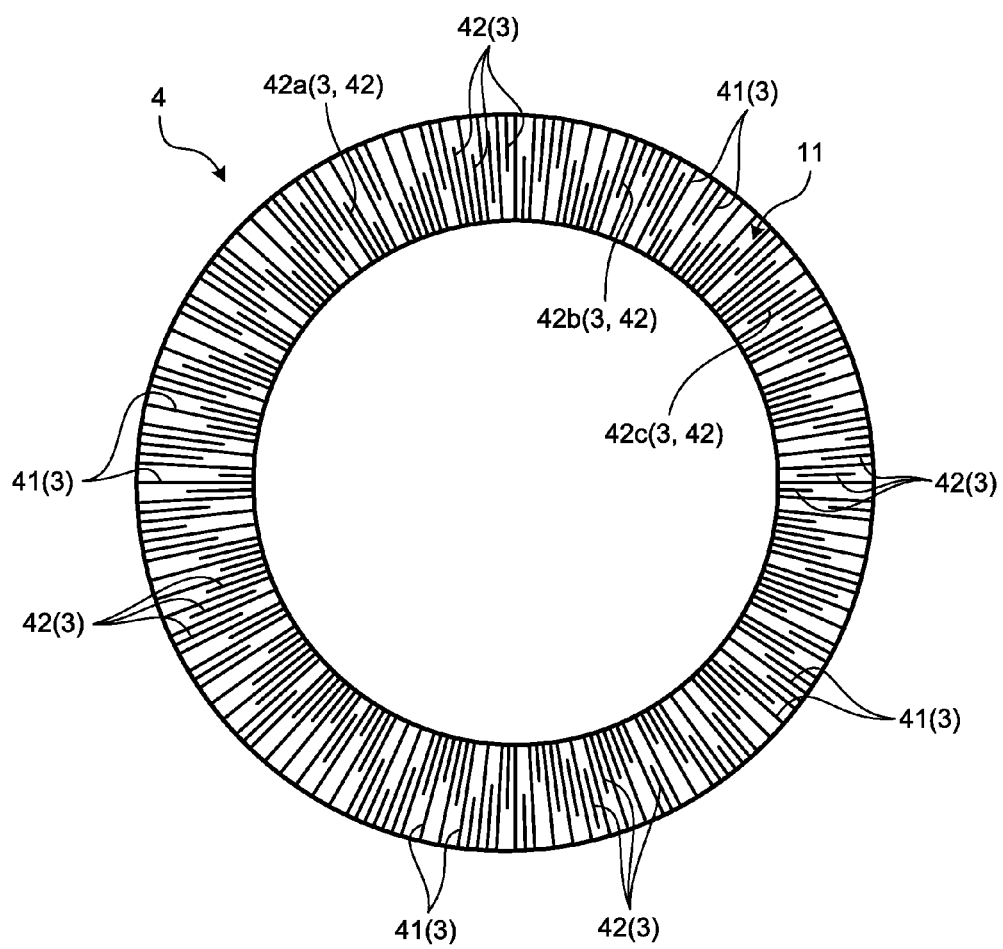
FIG. 15 is a schematic diagram illustrating a groove forming a radiation pattern of the dial plate applied to the vehicle display device according to the embodiment.
Figure 16:
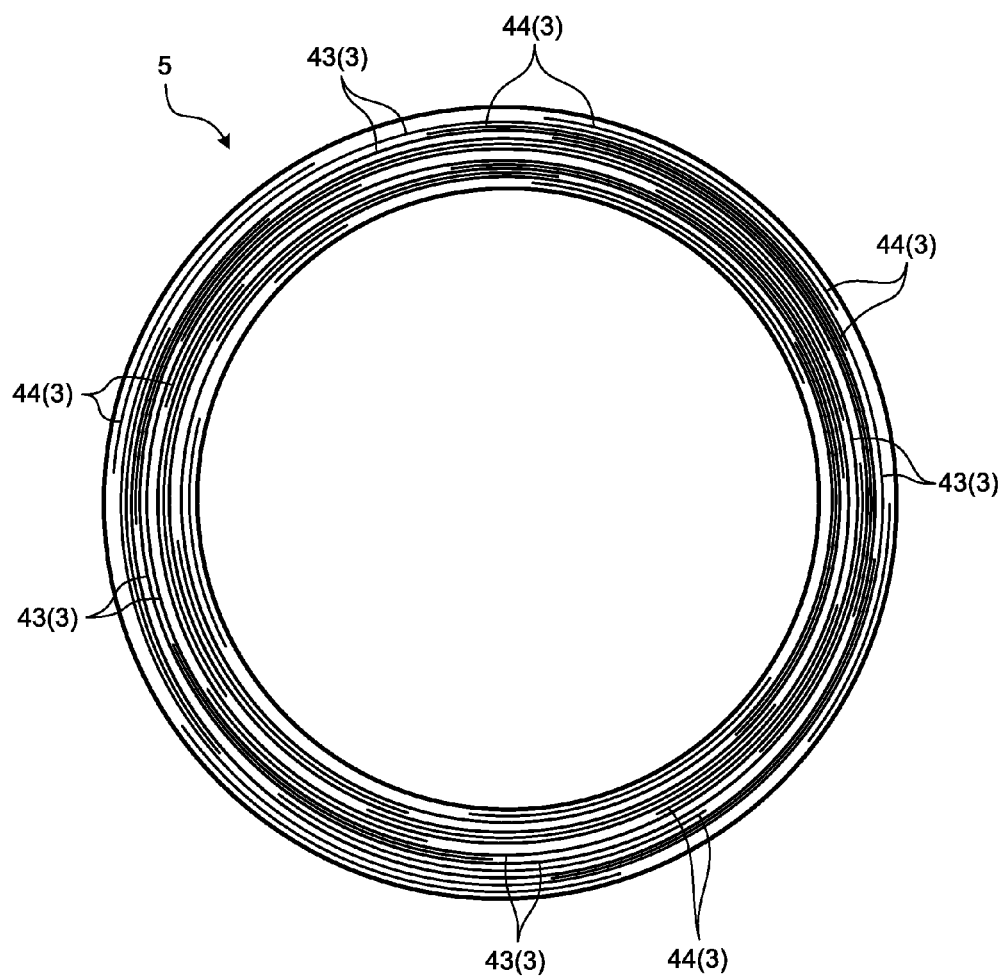
FIG. 16 is a schematic diagram illustrating a groove forming a spinning pattern of the dial plate applied to the vehicle display device according to the embodiment.
Figure 17:
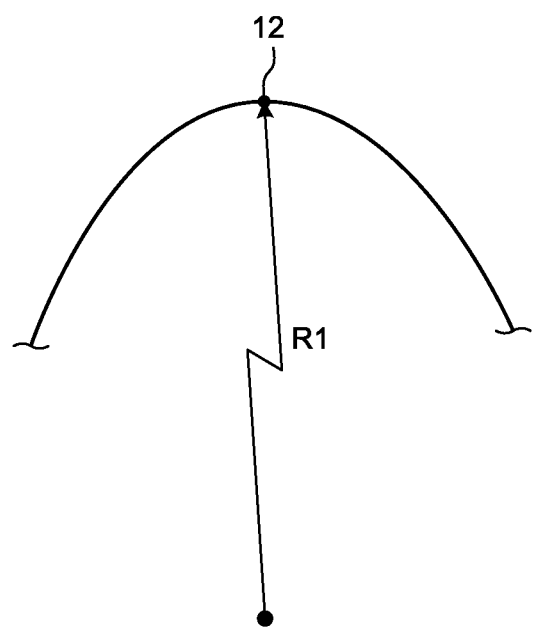
FIG. 17 is a schematic diagram illustrating a curvature radius of a corner forming a vertex of a groove of the dial plate applied to the vehicle display device according to the embodiment.

FIG. 1 is a front view illustrating a schematic configuration of a vehicle display device according to the embodiment. FIG. 2 is a cross-sectional view taken along a part A-A of FIG. 1. FIG. 3 is a front view illustrating a schematic configuration of a dial plate applied to the vehicle display device according to the embodiment. FIG. 4 is a schematic cross-sectional view illustrating a schematic configuration of the dial plate applied to the vehicle display device according to the embodiment. FIG. 5 is a schematic diagram illustrating an undulation waveform generated on a surface of a mirror surface. FIG. 6 is an explanatory diagram for obtaining an average height of an undulation curve. FIG. 7 is an explanatory diagram for obtaining an average length of the undulation curve. FIG. 8 is a line chart illustrating an example of measurement data of an undulation curve for the dial plate applied to the vehicle display device according to the embodiment. FIG. 9 is an explanatory diagram for obtaining arithmetic average roughness. FIG. 10 is a line chart illustrating an example of measurement data of a roughness curve for the dial plate applied to the vehicle display device according to the embodiment. FIG. 11 is a schematic diagram illustrating a curvature radius of a corner forming a vertex of a groove of the dial plate applied to the vehicle display device according to the embodiment. FIGS. 12, 13, and 14 are line charts illustrating an example of measurement data for the dial plate applied to the vehicle display device according to the embodiment. FIG. 15 is a schematic diagram illustrating a groove forming a radiation pattern of the dial plate applied to the vehicle display device according to the embodiment. FIG. 16 is a schematic diagram illustrating a groove forming a spinning pattern of the dial plate applied to the vehicle display device according to the embodiment. FIG. 17 is a schematic diagram illustrating a curvature radius of a corner forming a vertex of a groove of the dial plate applied to the vehicle display device according to the embodiment.

A decorative part 1 which is a decorative part for a vehicle display device according to the embodiment is applied to a vehicle display device 100 mounted on a vehicle as illustrated in FIGS. 1 and 2. The vehicle display device 100 constitutes a so-called in-vehicle meter and is mounted on, for example, an instrument panel provided at a dashboard of the vehicle to display various information on the vehicle as information to be used for driving the vehicle. The vehicle display device 100 includes a display unit 101 which displays information on the vehicle and the decorative part 1 which is assembled to each portion of the vehicle display device 100 including the display unit 101. Then, the vehicle display device 100 has a configuration in which a surface of a resinous substrate body 2 is variously decorated by the decorative part 1 so that a luxurious feeling given to a viewer is appropriately ensured.

Additionally, a width direction of the vehicle display device 100 illustrated in FIG. 1 typically corresponds to a vehicle width direction of the vehicle employing the vehicle display device 100. In the description below, in the width direction of the vehicle display device 100, a left side (a left side in FIG. 1) directed to a front surface of the vehicle display device 100 will be referred to as a left side in the width direction and a right side (a right side in FIG. 1) will be referred to as a right side in the width direction. Further, a depth direction of the vehicle display device 100 illustrated in FIG. 2 typically corresponds to a longitudinal direction of the vehicle employing the vehicle display device 100. Further, a front surface side of the vehicle display device 100 is a side directed toward a driver seat of the vehicle and is typically a side which is viewed by a driver sitting on the driver seat. Meanwhile, a rear surface side of the vehicle display device 100 is a side opposite to the front side in the depth direction and is typically a side which accommodates the instrument panel therein.

The display unit 101 displays various information on the vehicle. Here, as an example, the display unit 101 includes a speedometer 102 which displays a vehicle speed, a fuel gauge 103 which displays a remaining fuel amount, a tachometer 104 which displays an output rotating speed of a driving power source, a water temperature gauge 105 which displays a temperature of cooling water, a shift display unit 106 which displays a shift position, a turn display unit 107 which displays an operation state of a direction indicator (a blinker), a multi-display unit 108 which indicates other driving assistance information, and the like in order to display information on the vehicle. The display unit 101 is disposed inside a casing 109 which accommodates each unit of the vehicle display device 100 so that various information display surfaces are exposed to the front surface side in the depth direction. The casing 109 is formed of a resin material. The casing 109 includes, for example, a rear casing 110 which is disposed at a rear surface side in the depth direction, an intermediate casing 111 which is disposed at a front surface side of the rear casing 110 in the depth direction, and a facing member 112 which is disposed at a front surface side of the intermediate casing 111 in the depth direction and the display unit 101 is disposed inside a space formed defined by these members. Then, the casing 109 has a configuration in which the display surface of the display unit 101 is exposed to the front surface side in the depth direction through an opening 112*a* (see FIG. 2) formed at the facing member 112. Here, the display unit 101 has a configuration in which the display surface of the fuel gauge 103 is assembled into the display surface of the speedometer 102 and similarly the display surface of the water temperature gauge 105 is assembled into the display surface of the tachometer 104. The display unit 101 has a configuration in which the speedometer 102 and the fuel gauge 103 are disposed at the right side in the width direction inside the casing 109 and the tachometer 104 and the water temperature gauge 105 are disposed at the left side in the width direction inside the casing. Further, the shift display unit 106, the turn display unit 107, and the multi-display unit 108 are disposed therebetween.

For example, as illustrated in FIG. 2, the speedometer 102 has a configuration in which an inner device 114 is fixed to a wiring board 113 disposed inside the casing 109. The inner device 114 includes a motor 114*a* which is a drive source of a pointer 115 and a rotation shaft 116 of the pointer 115 protrudes from the motor 114*a*. The fuel gauge 103, the tachometer 104, and the water temperature gauge 105 also have substantially the same configuration as that of the speedometer 102. The facing member 112 covers the wiring board 113 or the inner device 114 and exposes the display surface of the display unit 101 (the speedometer 102, the fuel gauge 103, the tachometer 104, the water temperature gauge 105, the shift display unit 106, the turn display unit 107, the multi-display unit 108, and the like) to the front surface side in the depth direction from the opening 112*a* as described above. Additionally, the vehicle display device 100 is protected by a transparent cover of which a front surface side in the depth direction of the display unit 101 is attached to the casing 109.

The decorative part 1 is a decorative member of a part exposed to the front surface side in the depth direction of the vehicle display device 100 and entering a viewing angle of a passenger including a driver. The decorative part 1 is applied to, for example, the display unit 101, that is, dial plates 117 of the speedometer 102, the fuel gauge 103, the tachometer 104, the water temperature gauge 105, and the like. The dial plates 117 constitute a display surface which is exposed to the front surface side in the depth direction from the opening 112*a* of the facing member 112 in the speedometer 102, the fuel gauge 103, the tachometer 104, the water temperature gauge 105, and the like. The dial plate 117 includes a decoration of a scale indicated by the pointer 115 and decorations such as various patterns, symbols, and character strings relating to measurement values corresponding to the scale.

Hereinafter, an example of the dial plate 117 of the fuel gauge 103 which is assembled to the display surface of the speedometer 102 and the speedometer 102 will be described with reference to FIGS. 2, 3, and 4 and the like. Additionally, the same also applies to the dial plate 117 of the water temperature gauge 105 assembled to the display surface of the tachometer 104 and the tachometer 104.

In the dial plate 117 formed as the decorative part 1, a surface on the front surface side in the depth direction forms the display surface. Here, the dial plate 117 is formed in a substantially circular shape on the whole. The dial plate 117 is formed such that a shaft hole 118 is formed in an area including a substantially circular center axis line C1. The shaft hole 118 is a hole through which the rotation shaft 116 of the pointer 115 of the speedometer 102 passes and is formed by perforating the dial plate 117 in the depth direction. The shaft hole 118 is formed in a substantially circular shape about the center axis line C1. The dial plate 117 is formed such that a central disk portion 119, a boundary rising surface portion 120, a speedometer main scale portion 121, a speedometer auxiliary scale portion 122, a frame wall portion 123, a speedometer character display portion 124, and a cylindrical end surface portion 125 are concentrically formed in a substantially circular shape about the center axis line C1 in a direction from the shaft hole 118 toward the outside in the radial direction. In the dial plate 117, the speedometer main scale portion 121, the speedometer auxiliary scale portion 122, the speedometer character display portion 124, and the like serve as a part corresponding to the display surface of the speedometer 102.

The central disk portion 119 is formed in a substantially annular shape at the outside of the shaft hole 118 in the radial direction. The central disk portion 119 is formed in a honeycomb mesh shape and is provided with, for example, a unit of a physical amount displayed by the speedometer 102. Here, a character string such as "MPH" is provided. The boundary rising surface portion 120 is connected to the outside of the central disk portion 119 in the radial direction and is formed in a substantially annular shape. Here, the boundary rising surface portion 120 is formed as a substantially cylindrical rising surface which protrudes from the central disk portion 119 toward the front surface side in the depth direction along the center axis line C1. The speedometer main scale portion 121 is connected to the outside in the radial direction of the front surface side end of the boundary rising surface portion 120 in the depth direction and is formed in a substantially annular shape. The speedometer main scale portion 121 is provided with a plurality of main scales 121*a* which are provided to correspond to a physical amount, that is, a vehicle speed displayed by the speedometer 102 and are indicated by the pointer 115. The plurality of main scales 121*a* are formed in a protrusion shape at the same interval in the circumferential direction of the speedometer main scale portion 121. The speedometer auxiliary scale portion 122 is connected to the outside of the speedometer main scale portion 121 in the radial direction and is formed in a substantially annular shape. The speedometer auxiliary scale portion 122 is formed to be slightly inclined with respect to the speedometer main scale portion 121. The speedometer auxiliary scale portion 122 is provided with a plurality of auxiliary scales 122*a* which are provided to correspond to a physical amount, that is, a vehicle speed displayed by the speedometer 102 and are indicated by the pointer 115. The plurality of auxiliary scales 122a are provided at the same interval in the circumferential direction of the speedometer auxiliary scale portion 122. Here, the plurality of auxiliary scales are formed in a protrusion shape at an interval narrower than that of the plurality of main scales 121a. The frame wall portion 123 is connected to the outside of the speedometer auxiliary scale portion 122 in the radial direction and is formed in a substantially annular shape. The frame wall portion 123 is formed to be slightly inclined with respect to the speedometer auxiliary scale portion 122. More specifically, the frame wall portion is formed to be further inclined with respect to the speedometer main scale portion 121 in relation to the speedometer auxiliary scale portion 122. The speedometer character display portion 124 is connected to the outside of the frame wall portion 123 in the radial direction and is formed in a substantially annular shape. The speedometer character display portion 124 is formed to be reversely inclined with respect to the frame wall portion 123. The speedometer character display portion 124 is provided with a plurality of character strings 124a indicating a measurement value, that is, a plurality of character strings 124a indicating a vehicle speed. As the plurality of character strings 124a, "20", "40", "60", and the like are formed in a protrusion shape at the same interval in the circumferential direction of the speedometer character display portion 124. The cylindrical end surface portion 125 is connected to the outside of the speedometer character display portion 124 in the radial direction and is formed in a substantially annular shape. Here, the cylindrical end surface portion 125 is formed in a substantially cylindrical rising surface which is folded back from the speedometer character display portion 124 toward the rear surface side in the depth direction along the center axis line C1. Additionally, the dial plate 117 is provided with an attachment portion 126 which is provided at the further outside of the cylindrical end surface portion 125 in the radial direction so as to be used when the dial plate 117 is provided in the casing 109 or the like.

Further, the dial plate 117 of the embodiment is provided with a fuel gauge circular plate portion 127, a fuel gauge scale portion 128, and a boundary annular portion 129 to be assembled to the central disk portion 119, the boundary rising surface portion 120, and the speedometer main scale portion 121. The dial plate 117 is provided with a shaft hole 130 which is formed in an area including a reference line C2 set to a position (a position which is offset downward in FIG. 3) offset from the center axis line C1 and parallel to the center axis line C1. The shaft hole 130 is a hole through which the rotation shaft of the pointer 115 of the fuel gauge 103 passes and penetrates the dial plate 117 in the depth direction. The shaft hole 130 is formed in a substantially circular shape about the reference line C2. In the dial plate 117, the fuel gauge circular plate portion 127, the fuel gauge scale portion 128, and the boundary annular portion 129 are concentrically formed in a substantially annular shape about the reference line C2 from the shaft hole 130 toward the outside in the radial direction. In the dial plate 117, the fuel gauge circular plate portion 127, the fuel gauge scale portion 128, and the like serve as a part corresponding to the display surface of the fuel gauge 103.

The fuel gauge circular plate portion 127 is formed in a substantially annular shape at the outside of the shaft hole 130 in the radial direction. The fuel gauge circular plate portion 127 is provided with a character string 127a which indicates a physical amount displayed by the fuel gauge 103. Here, various patterns or the character strings 127a such as "½", "E (which is an initial letter of Empty)", and "F (which is an initial letter of Full)" indicating a remaining fuel amount are provided. The fuel gauge scale portion 128 is connected to the outside of the fuel gauge circular plate portion 127 in the radial direction and is formed in a substantially annular shape. The fuel gauge scale portion 128 is provided with a plurality of scales 128a which are provided to correspond to a physical amount, that is, a remaining fuel amount displayed by the fuel gauge 103 and are indicated by the pointer 115. The plurality of scales 128a are formed at the same interval in the circumferential direction of the fuel gauge scale portion 128. The boundary annular portion 129 is connected to the outside of the fuel gauge scale portion 128 in the radial direction and is formed in a substantially annular shape. The boundary annular portion 129 is interposed between a group of the central disk portion 119, the boundary rising surface portion 120, and the speedometer main scale portion 121 and a group of the fuel gauge circular plate portion 127 and the fuel gauge scale portion 128 and serves as a boundary between an area serving as the display surface of the speedometer 102 and the display surface of the fuel gauge 103 in the dial plate 117.

Then, the dial plate 117 formed as the decorative part 1 of the embodiment includes the substrate body 2 which is formed of black synthetic resin and a plurality of grooves 3 which are formed on the surface of the substrate body 2. In the dial plate 117, the surface of the substrate body 2 forms the display surface of the dial plate 117 and a decoration such as a pattern or a mirror surface is performed a predetermined area by the plurality of grooves 3 formed on the display surface.

Here, the surface of the substrate body 2 is a surface at the front surface side in the depth direction, that is, a surface facing the driver seat of the vehicle and is typically a surface which is viewed by the driver sitting on the driver seat.

The substrate body 2 is integrally molded by black synthetic resin using a molding die and an entire part including the central disk portion 119, the boundary rising surface portion 120, the speedometer main scale portion 121, the speedometer auxiliary scale portion 122, the frame wall portion 123, the speedometer character display portion 124, the cylindrical end surface portion 125, the attachment portion 126, the fuel gauge circular plate portion 127, the fuel gauge scale portion 128, the boundary annular portion 129 or the main scale 121a, the auxiliary scale 122a, the character string 124a, the character string 127a, and the scale 128a is formed as a single part. In the substrate body 2, the groove 3 is formed in such a manner that a groove formed on a molding surface of the molding die is transferred to the surface of the substrate body 2 when black synthetic resin is integrally molded by the molding die.

The plurality of grooves 3 of the embodiment form various patterns on the surface of the dial plate 117. In the dial plate 117 of the embodiment, as an example, a so-called radiation pattern 4 is performed on the surfaces of the speedometer main scale portion 121 and the fuel gauge circular plate portion 127 by the plurality of grooves 3 and a spinning pattern 5 is performed on the surfaces of the speedometer character display portion 124 and the fuel gauge scale portion 128 by the plurality of grooves 3. The radiation pattern 4 is a pattern in which the plurality of microscopic grooves 3 are formed radially to extend outward from a preset reference point (for example, a point on the center axis line C1 or the reference line C2) or the vicinity thereof and is called a radial pattern. The spinning pattern 5 is a pattern in which the plurality of microscopic grooves 3 extend in a spiral shape or a concentric annual shape about a preset reference point (for example, a point on the center axis line C1 or the reference line C2).

Then, since the dial plate 117 of the embodiment further includes a mirror surface 6 having a predetermined shape, a further appropriate luxurious feeling is ensured. The mirror surface 6 of the embodiment is applied to the surfaces of the boundary rising surface portion 120, the frame wall portion 123, the cylindrical end surface portion 125, the boundary annular portion 129, and the like.

Specifically, the mirror surface 6 is formed so that the mirror surface roughness Ra becomes larger than 0 and equal to or smaller than 0.35 μm and the ratio of the wavelength Wsm in the case of the amplitude Wc of 1 which is captured by the ratio of the wavelength Wsm corresponding to the average length and the amplitude Wc corresponding to the average height of the undulation waveform in the undulation curve in which the cutoff value from the surface shape of the substrate body 2 is 250 μm becomes equal to or larger than 1:600 and equal to or smaller than 1:6000. That is, the mirror surface 6 is formed so that the following conditional equation (1) is satisfied when the amplitude corresponding to the average height of the undulation waveform is indicated by "Wc" and the wavelength corresponding to the average length of the undulation waveform is indicated by "Wsm" in the undulation curve in which the cutoff value from the surface shape of the substrate body 2 is 250 μm and the mirror surface roughness is indicated by "Ra".

$$1:600 \leq Wc:Wsm \leq 1:6000 \text{ and } 0 < Ra \leq 0.35 \text{ μm} \quad (1)$$

More desirably, the mirror surface 6 is formed so that the ratio of the wavelength Wsm in the case of the amplitude Wc of 1 becomes equal to or larger than 1:1000 and equal to or smaller than 1:6000 and the mirror surface roughness Ra becomes larger than 0 and equal to or smaller than 0.35 μm. That is, it is more desirable to form the mirror surface 6 so that the following conditional equation (2) is satisfied.

$$1:1000 \leq Wc:Wsm \leq 1:6000 \text{ and } 0 < Ra \leq 0.35 \text{ μm} \quad (2)$$

Most desirably, the mirror surface 6 is formed so that the ratio of the wavelength Wsm in the case of the amplitude Wc of 1 becomes equal to or larger than 1:1400 and equal to or smaller than 1:6000 and the mirror surface roughness Ra becomes larger than 0 and equal to or smaller than 0.30 μm. That is, it is more desirable to form the mirror surface 6 so that the following conditional equation (3) is satisfied.

$$1:1400 \leq Wc:Wsm \leq 1:6000 \text{ and } 0 < Ra \leq 0.30 \text{ μm} \quad (3)$$

Additionally, the lower limit value of the mirror surface roughness Ra may be typically within a range in which a manufacturing process can be performed.

Here, as illustrated in FIG. 5, the undulation waveform generated on the surface of the mirror surface 6 is provided as an image and the image is used to capture the undulation waveforms having the amplitude Wc and the wavelength Wsm.

As illustrated in an example of FIG. 6, the amplitude Wc indicates the average height of the undulation waveform in the undulation curve in which the cutoff value from the surface shape of the substrate body 2 is 250 μm and is expressed by the following expression (A). In the expression (A), "m" indicates a natural number.

$$Wc = \frac{1}{m} \sum_{i=1}^{m} Zti \quad (A)$$

As illustrated in an example of FIG. 7, the wavelength Wsm indicates the average length of the undulation waveform in the undulation curve in which the cutoff value from the surface shape of the substrate body 2 is 250 μm and is expressed by the following expression (B). In the expression (B), "m" indicates a natural number.

$$Wsm = \frac{1}{m} \sum_{i=1}^{m} Xsi \quad (B)$$

The ratio of the wavelength Wsm in the case of the amplitude Wc of 1 is calculated from the amplitude Wc and the wavelength Wsm after the amplitude Wc and the wavelength Wsm are measured. The ratio of the wavelength Wsm in the case of the amplitude Wc of 1 is an index for capturing the undulation and the smoothness of the surface and corresponds to an index for capturing the distortion of the reflected image herein. Typically, there is a tendency that the undulation becomes sharp and the distortion of the reflected image becomes large as the value of the ratio of the wavelength Wsm in the case of the amplitude Wc of 1 becomes small. Meanwhile, there is a tendency that the undulation becomes gentle and the distortion of the reflected image becomes small as the value of the ratio becomes large.

The dial plate 117 formed as the decorative part 1 is formed in a shape in which the ratio of the wavelength Wsm in the case of the amplitude Wc of 1 based on the amplitude Wc and the wavelength Wsm measured by a predetermined measurement condition satisfies any one of the conditional equations (1) to (3).

Additionally, as an example, the following condition can be exemplified as a predetermined measurement condition which is set in advance to measure the amplitude Wc and the wavelength Wsm of the surface of the mirror surface 6. That is, a measurement is performed according to the following procedure by using "3D measurement laser microscope LEXT OLS 4000 manufactured by Olympus Corporation" as a measurement device used to measure the amplitude We and the wavelength Wsm.

<step 1-1> An image of the surface of the mirror surface 6 of the dial plate 117 formed as the decorative part 1 is captured in the "capturing" mode by the "3D measurement laser microscope LEXT OLS 4000 manufactured by Olympus Corporation".

<step 1-2> After the image is captured, the "measurement" tab is selected on an operation screen (hereinafter, simply referred to as an "operation screen") of the "3D measurement laser microscope LEXT OLS 4000 manufactured by Olympus Corporation" so that the mode is switched to the "measurement" mode and the "linear roughness" is selected from the measurement mode.

<step 1-3> Next, the "X direction" (typically, a direction crossing the boundary rising surface portion 120, the frame wall portion 123, the cylindrical end surface portion 125, the boundary annular portion 129, and the like) is selected in the "designation of measurement line" of the operation screen.

<step 1-4> Next, the "undulation parameter" is selected in the "analysis parameter" of the operation screen.

<step 1-5> Next, "250 μm" is selected in the "cutting" of the operation screen.

<step 1-6> Next, the "undulation" tab is selected among the tabs of the "cross-section", the "roughness", the "undulation", and the "mix" in the section of the "roughness measurement" of the operation screen. As a result, as illustrated in an example of FIG. 8, the operation screen displays measurement data (a smooth curve) of the undulation curve in which the wavelength component of 250 μm or less is removed from the measurement data of the surface of the mirror surface 6 of the dial plate 117 captured as an image by <step 1-1>.

<step 1-7> Next, the numerical values of the "amplitude Wc" and the "wavelength Wsm" among various indexes displayed in the section of the "analysis parameter" of the operation screen are read and the read numerical values respectively become the measurement values of the "amplitude Wc" and the "wavelength Wsm".

<step 1-8> Next, the ratio of the wavelength Wsm in the case of the amplitude Wc of 1 is calculated from Wsm/Wc based on the measurement values of the "amplitude Wc" and the "wavelength Wsm".

Meanwhile, as illustrated in an example of FIG. 9, the mirror surface roughness Ra is a so-called arithmetic average roughness Ra and can be expressed by the following expression (C) when only the reference length $l$ in the direction of the average line is extracted from the roughness curve, the X axis is set in the direction of the average line of the extracted part, the Y axis is set in the direction of the longitudinal magnification, and the roughness curve is expressed by y=f(x).

$$Ra = \frac{1}{l} \int_0^l |f(x)| dx \qquad (C)$$

The mirror surface roughness Ra is an index for capturing a depth (a height) of the microscopic unevenness of the surface and corresponds to an index for capturing a blur degree of a reflected image. Typically, there is a tendency that the microscopic unevenness becomes shallow and the contour of the reflected image becomes clear as the value of the mirror surface roughness Ra becomes small. Meanwhile, there is a tendency that the microscopic unevenness becomes deep and the contour of the reflected image becomes blurred as the value of the mirror surface roughness Ra becomes large.

The dial plate 117 formed as the decorative part 1 is formed in a shape in which the mirror surface roughness Ra measured by a predetermined measurement condition satisfies any one of the conditional equations (1) to (3).

Additionally, as an example, the following condition can be exemplified as a predetermined measurement condition which is set in advance to measure the mirror surface roughness Ra of the surface of the mirror surface 6. That is, a measurement is performed according to the following procedure by using "3D measurement laser microscope LEXT OLS 4000 manufactured by Olympus Corporation" as a measurement device used to measure the mirror surface roughness Ra similarly to the description above.

<step 2-1> An image of the surface of the mirror surface 6 of the dial plate 117 formed as the decorative part 1 is captured in the "capturing" mode by the "3D measurement laser microscope LEXT OLS 4000 manufactured by Olympus Corporation".

<step 2-2> After the image is captured, the "measurement" tab is selected on the operation screen of the "3D measurement laser microscope LEXT OLS 4000 manufactured by Olympus Corporation" so that the mode is switched to the "measurement" mode and the "linear roughness" is selected from the measurement mode.

<step 2-3> Next, the "X direction" (typically, a direction crossing the boundary rising surface portion 120, the frame wall portion 123, the cylindrical end surface portion 125, the boundary annular portion 129, and the like) is selected in the "designation of measurement" of the operation screen.

<step 2-4> Next, the "roughness parameter" is selected in the "analysis parameter" of the operation screen.

<step 2-5> Next, "250 μm" is selected in the "cutting" of the operation screen.

<step 2-6> Next, the "roughness" tab is selected among the tabs of the "cross-section", the "roughness", the "undulation", and the "mix" in the section of the "roughness measurement" of the operation screen. As a result, as illustrated in an example of FIG. 10, the operation screen displays the measurement data (without the undulation) of the roughness curve in which the wavelength component of 250 μm or less is removed from the measurement data of the surface of the mirror surface 6 of the dial plate 117 captured as an image by <step 2-1>.

<step 2-7> Next, the numerical value of the "arithmetic average roughness Ra" among various indexes displayed in the section of the "analysis parameter" of the operation screen is read and the read numerical value becomes the measurement value of the "mirror surface roughness Ra".

When the dial plate 117 formed as the decorative part 1 is formed in a shape in which the mirror surface roughness Ra and the ratio of the wavelength Wsm in the case of the amplitude Wc of 1 in the mirror surface 6 satisfy any one of the conditional equations (1) to (3), it is possible to suppress the distortion of the image reflected on the mirror surface 6 substantially similarly to, for example, an image reflected on metal having a luxurious feeling and to realize a blurred feeling similarly to the image reflected on the metal having a luxurious feeling as the blurred feeling of the image reflected on the mirror surface 6. Accordingly, it is possible to realize, for example, a gloss of fine piano black.

Further, since the dial plate 117 of the embodiment further includes a ridge line 7 formed in a predetermined shape as illustrated in FIGS. 2 and 3, an appropriate luxurious feeling can be further ensured. The ridge line 7 is formed by the intersection of different surfaces of the substrate body 2 and typically serves as a boundary between different areas. The ridge line 7 forms a corner (an external corner) in which different surfaces each having a different angle meet each other. The ridge line 7 may be a boundary between areas of different patterns, similar patterns, or non-patterns. The dial plate 117 includes the plurality of ridge lines 7. Here, the plurality of ridge lines 7 include a ridge line 7a which is formed by the intersection of the boundary rising surface portion 120 and the speedometer main scale portion 121, a ridge line 7b which is formed by the intersection of the frame wall portion 123 and the speedometer character display portion 124, a ridge line 7c which is formed by the intersection of the speedometer character display portion 124 and the cylindrical end surface portion 125, a ridge line 7d which is formed by the intersection of the fuel gauge scale portion 128 and the boundary annular portion 129, and the like. The ridge line 7a is a boundary line between the boundary rising surface portion 120 of which the surface is formed as the mirror surface 6 and the speedometer main scale portion 121 of which the surface is provided with the radiation pattern 4. The ridge line 7b is a boundary line between the frame wall portion 123 of which the surface is formed as the mirror surface 6 and the speedometer character display portion 124 of which the surface is provided with the spinning pattern 5. The ridge line 7c is a boundary line between the speedometer character display portion 124 of which the surface is provided with the spinning pattern 5 and the cylindrical end surface portion 125 of which the surface is formed as the mirror surface 6. The ridge line 7d is a boundary line between the fuel gauge scale portion 128 of which the surface is provided with the spinning pattern 5 and the boundary annular portion 129 of which the surface is formed as the mirror surface 6. Additionally, in the description below, the ridge line 7 will be simply used when there is no need to particularly distinguish the ridge line 7a, the ridge line 7b, the ridge line 7c, and the ridge line 7d.

Then, as illustrated in FIG. 11 and the like, the ridge line 7 of the embodiment is formed so that the curvature radius R of the corner 8 forming the vertex becomes larger than 0 and equal to or smaller than 28.0 µm. That is, the plurality of ridge lines 7 are formed to satisfy the conditional equation in the following expression (4) when the curvature radius of the corner 8 forming the vertex is indicated by "R".

$$0 < R \leq 28.0 \text{ µm} \tag{4}$$

More desirably, the plurality of ridge lines 7 are formed so that the curvature radius R of the corner 8 forming the vertex becomes larger than 0 and equal to or smaller than 10.0 µm. That is, it is more desirable to form the plurality of ridge lines 7 so that the conditional equation in the following expression (5) is satisfied.

$$0 < R \leq 10.0 \text{ µm} \tag{5}$$

Additionally, the lower limit value of the curvature radius R of the corner 8 forming the vertex of the ridge line 7 may be typically within a range in which a manufacturing process can be performed.

Here, as illustrated in FIG. 11, the curvature radius R of the corner 8 forming the vertex of the ridge line 7 corresponds to a radius of a circular arc contacting the corner 8. The dial plate 117 formed as the decorative part 1 is formed in a shape in which the curvature radius R of the corner 8 forming the vertex of the ridge line 7 measured by a predetermined measurement condition satisfies any one of the conditional equations in the expressions (4) and (5). Additionally, an example illustrated in FIG. 11 illustrates the ridge line 7c which is the boundary line between the speedometer character display portion 124 of which the surface is provided with the spinning pattern 5 and the cylindrical end surface portion 125 of which the surface is formed as the mirror surface 6. An angle θ formed between different surfaces forming the ridge line 7c, that is, the surface of the speedometer character display portion 124 and the surface of the cylindrical end surface portion 125 is larger than 90°. That is, the corner 8 of the ridge line 7c has an obtuse angle. That is, different surfaces forming the ridge line 7c intersect each other at an angle larger than 90°.

Additionally, as an example, the following condition can be exemplified as a predetermined measurement condition which is set in advance to measure the curvature radius R of the corner 8 forming the vertex of the ridge line 7. That is, a measurement is performed according to the following procedure by using "3D measurement laser microscope LEXT OLS 4000 manufactured by Olympus Corporation" as a measurement device used to measure the curvature radius R similarly to the description above.

<step 3-1> An image of the surface of the dial plate 117 formed as the decorative part 1 is captured in the "capturing" mode by the "3D measurement laser microscope LEXT OLS 4000 manufactured by Olympus Corporation".

<step 3-2> After the image is captured, the "measurement" tab is selected on the operation screen of the "3D measurement laser microscope LEXT OLS 4000 manufactured by Olympus Corporation" so that the mode is switched to the "measurement" mode and the "profile measurement" is selected. As a result, profile data (contour data) of the surface of the dial plate 117 illustrated in FIG. 12 is displayed on the operation screen.

<step 3-3> Next, the "curvature" in the "designation of the measurement item" is selected on the operation screen. Accordingly, a circle L1 and a line L2 are displayed in the profile data of the surface of the dial plate 117 displayed by <step 3-2>. When the line L2 moves left and right on the profile data, the size of the circle L1 also changes in response to the movement.

<step 3-4> Then, the line L2 displayed on the profile data of the surface of the dial plate 117 is moved so that the circle L1 matches the curved surface of the corner 8 forming the vertex of the ridge line 7. In this way, the radius of the circle L1 matching the curved surface of the corner 8 becomes the measurement value of the curvature radius R of the corner 8 forming the vertex of the ridge line 7.

When the dial plate 117 formed as the decorative part 1 is formed in a shape in which the corner 8 forming the vertex of the ridge line 7 satisfies any one of the conditional equations in the expressions (4) and (5), it is possible to realize a sharp feeling similarly to, for example, a groove formed by cutting metal having a luxurious feeling in the ridge line 7 formed by the intersection of different surfaces.

Further, the plurality of grooves 3 forming the radiation pattern 4 or the spinning pattern 5 of the embodiment are formed so that the width W illustrated in FIG. 4 becomes larger than 0 and equal to or smaller than 3.0 µm and the height H illustrated in FIG. 4 becomes larger than 0 and equal to or smaller than 1.0 µm. That is, the plurality of grooves 3 are formed to satisfy the conditional equation in the following expression (6) when the width illustrated in FIG. 4 is indicated by "W" and the height illustrated in FIG. 4 is indicated by "H".

$$0 < W \leq 3.0 \text{ µm and } 0 < H \leq 1.0 \text{ µm} \tag{6}$$

More desirably, the plurality of grooves 3 are formed so that the width W becomes larger than 0 and equal to or smaller than 2.7 µm and the height H becomes larger than 0 and equal to or smaller than 0.35 µm. That is, it is desirable to form the plurality of grooves 3 so that the conditional equation in the following expression (7) is satisfied.

$$0 < W \leq 2.7 \text{ µm and } 0 < H \leq 0.35 \text{ µm} \tag{7}$$

Additionally, the lower limit values of the width W and the height H may be typically within a range in which a manufacturing process can be performed and a visible state is ensured. The lower limit value of the width W may be, for example, about 0.1 µm (0.1 µm≤W). More specifically, the width W may be larger than 1.0 µm (1.0 µm≤W).

Here, more specifically, as illustrated in FIG. 4, the width W corresponds to the width between the bottom points (bottoms) 10 of the adjacent grooves 3 located at both sides of the vertex (a peak) 9 between the adjacent grooves 3. Meanwhile, as illustrated in FIG. 4, the height H corresponds to the height of the vertex 9 between the adjacent grooves 3 at the lower side of the bottom points 10 of the adjacent grooves 3. The dial plate 117 formed as the decorative part 1 is formed in a shape in which both the width W and the height H measured by a predetermined measurement condition of the surface provided with the groove 3 satisfy any one of the conditional equations in the expressions (6) and (7).

Additionally, as an example, the following condition can be exemplified as a predetermined measurement condition which is set in advance to measure the width W and the height H. That is, a measurement is performed according to the following procedure by using "3D measurement laser microscope LEXT OLS 4000 manufactured by Olympus Corporation" as a measurement device used to measure the width W and the height H similarly to the description above.

<step 4-1> An image of the surface of the dial plate 117 formed as the decorative part 1 is captured in the "capturing" mode of the "3D measurement laser microscope LEXT OLS 4000 manufactured by Olympus Corporation".

<step 4-2> After the image is captured, the "measurement" tab is selected on the operation screen of the "3D measurement laser microscope LEXT OLS 4000 manufactured by Olympus Corporation" so that the mode is switched to the "measurement" mode and the "profile measurement" is selected. As a result, the operation screen displays the profile data (contour data) of the surface of the dial plate 117 illustrated in FIG. 13. In FIG. 13, a horizontal axis indicates a position in an arbitrary direction of the surface of the captured dial plate 117 and a vertical axis indicates a height of the surface at the corresponding surface position.

<step 4-3> Next, a predetermined part (measurement parts of the width W and the height H) of the profile data of the surface of the dial plate 117 displayed by <step 4-2> is widened on the operation screen. FIG. 14 is an example of the widened profile data.

<step 4-4> Next, in the profile data of the surface of the dial plate 117 widened by <step 4-3> on the operation screen, a left vertical axis measurement line L3 is adjusted to a left bottom point (corresponding to one of the bottom points 10 of the adjacent grooves 3) among the adjacent bottom points (bottoms) and a right vertical axis measurement line L4 is adjusted to a right bottom point (corresponding to the other of the bottom points 10 of the adjacent grooves 3) among the adjacent bottom points (bottoms). Further, in the profile data of the surface of the dial plate 117 widened by <step 4-3> on the operation screen, an upper horizontal axis measurement line L5 is adjusted to a vertex (a peak (corresponding to the vertex 9 between the adjacent grooves 3)) between the adjacent bottom points and a lower horizontal axis measurement line L6 is adjusted to a lower side (corresponding to a lower side of the bottom points 10 of the adjacent grooves 3) among the bottom points located at both sides of the vertex. In this way, a distance between the vertical axis measurement line L3 and the vertical axis measurement line L4 becomes a measurement value of the width W and a distance between the horizontal axis measurement line L5 and the horizontal axis measurement line L6 becomes a measurement value of the height H.

When the dial plate 117 formed as the decorative part 1 is formed in a shape in which the width W and the height H satisfy any one of the conditional equations in the expressions (6) and (7), it is possible to realize the width and the height (the depth) similarly to a groove formed by cutting, for example, metal having a luxurious feeling in the plurality of grooves 3 forming the radiation pattern 4 or the spinning pattern 5.

Here, it is desirable to form the plurality of grooves 3 forming the radiation pattern 4 or the spinning pattern 5 of the embodiment so that the distribution width of the width W becomes equal to or larger than 1.2 μm and the distribution width of the height becomes equal to or larger than 0.3 μm. Here, the distribution width of the width W corresponds to a width between the maximum value and the minimum value of the width W measured as described above from the surface provided with the groove 3 in the dial plate 117. In other words, the distribution width of the width corresponds to a value obtained by subtracting the minimum value from the maximum value. Similarly, the distribution width of the height H corresponds to a width between the maximum value and the minimum value of the height H measured as described above from the surface provided with the groove 3 in the dial plate 117. In other words, the distribution width of the height corresponds to a value obtained by subtracting the minimum value from the maximum value. Accordingly, the dial plate 117 formed as the decorative part 1 can create a random feeling by forming a variation in shape of the plurality of grooves 3.

Additionally, as illustrated in FIG. 15, the plurality of grooves 3 forming the radiation pattern 4 may include a penetration groove 41 which is a first linear groove and a blocking groove 42 which is a second linear groove. The penetration groove 41 is a groove which extends in a linear shape and penetrates a predetermined formation area 11 among the plurality of grooves 3 forming the radiation pattern 4. In other words, the penetration groove 41 is a groove which extends in a linear shape and does not include a blocking end inside the formation area 11. Here, the formation area 11 is an area which is provided with the radiation pattern 4 and is a predetermined area. That is, the formation area 11 is depicted as an annular area. Meanwhile, the blocking groove 42 is a groove which extends in a linear shape and of which at least one end inside the formation area 11 is blocked among the plurality of grooves 3 forming the radiation pattern 4. The blocking groove 42 may include a groove (a blocking groove 42a) of which a radial outer end is blocked, a groove (a blocking groove 42b) of which a radial inner end is blocked, and a groove (a blocking groove 42c) of which both a radial outer end and a radial inner end are blocked. Further, the penetration groove 41 and the blocking groove 42 may intersect each other. The penetration groove 41 and the blocking groove 42 may be applied to, for example, the radiation pattern 4 formed on the speedometer main scale portion 121 and the fuel gauge circular plate portion 127. In this case, the dial plate 117 is formed so that an area defined on the surfaces of the speedometer main scale portion 121 and the fuel gauge circular plate portion 127 becomes the formation area 11 provided with the radiation pattern 4. Accordingly, the dial plate 117 formed as the decorative part 1 can create a random feeling by forming a variation in shape of the plurality of grooves 3 in such a manner that the penetration groove 41 and the blocking groove 42 are provided as the plurality of grooves 3 forming the radiation pattern 4.

Further, as illustrated in FIG. 16, the plurality of grooves 3 forming the spinning pattern 5 may include a main curved groove 43 which is a first curved groove and an auxiliary curved groove 44 which is a second curved groove. The main curved groove 43 is a groove which is formed in a circular arc or annular shape about a reference point (for example, a point on the center axis line C1 or the reference line C2) and extends so that the sum of the center angle with respect to the reference point becomes 360° or more among the plurality of grooves 3 forming the spinning pattern 5. The main curved groove 43 may include an annular groove which is formed about the reference point and a spiral annular groove which is obtained by a combination of circular arcs and is formed so that the sum of the center angle with respect to the reference point becomes 360° or more. Meanwhile, the auxiliary curved groove 44 is a groove which is formed in a circular arc shape about the reference point and extends so that the sum of the center angle with respect to the reference point becomes smaller than 360° among the plurality of grooves 3 forming the spinning pattern 5. The main curved groove 43 and the auxiliary curved groove 44 may intersect each other. The main curved groove 43 and the auxiliary curved groove 44 may be applied to, for example, the spinning pattern 5 formed on the speedometer character display portion 124 and the fuel gauge scale portion 128. Accordingly, the dial plate 117 formed as the decorative part 1 can create a random feeling by forming a variation in shape of the plurality of grooves 3 in such a manner that the main curved groove 43 and the auxiliary curved groove 44 are provided as the plurality of grooves 3 forming the spinning pattern 5.

Further, as illustrated in FIGS. 4 and 17 and the like, the plurality of grooves 3 forming the radiation pattern 4 or the spinning pattern 5 of the embodiment are formed so that the curvature radius R1 of a corner 12 forming the vertex 9 between the adjacent grooves 3 becomes larger than 0 and equal to or smaller than 38.0 μm. That is, the plurality of grooves 3 may be formed to satisfy the conditional equation in the following expression (8) when the curvature radius of the corner 12 forming the vertex between the adjacent grooves 3 is indicated by "R1".

$$0 < R1 \leq 38.0 \ \mu m \quad (8)$$

More desirably, the plurality of grooves 3 are formed so that the curvature radius R1 of the corner 12 forming the vertex between the adjacent grooves 3 becomes larger than 0 and equal to or smaller than 36.0 μm. That is, it is more desirable to form the plurality of grooves 3 so that the conditional equation in the following expression (9) is satisfied.

$$0 < R1 \leq 36.0 \ \mu m \quad (9)$$

Most desirably, the plurality of grooves 3 are formed so that the curvature radius R1 of the corner 12 forming the vertex between the adjacent grooves 3 becomes larger than 0 and equal to or smaller than 33.0 μm. That is, it is desirable to form the plurality of grooves 3 so that the conditional equation in the following expression (10) is satisfied.

$$0 < R1 \leq 33.0 \ \mu m \quad (10)$$

Additionally, the lower limit value of the curvature radius R1 of the corner 12 may be typically within a range in which a manufacturing process can be performed.

Here, as illustrated in FIG. 17, the curvature radius R1 of the corner 12 forming the vertex between the adjacent grooves 3 corresponds to the radius of the circular arc contacting the corner 12. The dial plate 117 formed as the decorative part 1 is formed in a shape in which the curvature radiuses R1 of all corners 12 measured by a predetermined measurement condition satisfy any one of the conditional equations in the expressions (8) to (10).

Additionally, a predetermined measurement condition which is set in advance to measure the curvature radius R1 of the corner 12 forming the vertex between the adjacent grooves 3 is substantially the same as a predetermined measurement condition (<step 3-1> to <step 3-4>) which is set in advance to measure the curvature radius R of the corner 8 forming the vertex of the ridge line 7. In this case, an operation in <step 3-4> is performed as below. That is, the line L2 displayed on the profile data of the surface of the dial plate 117 is moved so that the circle L1 matches the curved surface of the corner 12 forming the vertex between the adjacent grooves 3. In this way, the radius of the circle L1 matching the curved surface of the corner 12 becomes the measurement value of the curvature radius R1 of the corner 12 forming the vertex between the adjacent grooves 3.

When the dial plate 117 formed as the decorative part 1 is formed in a shape in which the curvature radius R1 of the corner 12 satisfies any one of the conditional equations in the expressions (8) to (10), it is possible to realize a sharp feeling similarly to, for example, a groove formed by cutting metal having a luxurious feeling in the plurality of grooves 3 forming the radiation pattern 4 or the spinning pattern 5.

Here, it is desirable to form the dial plate 117 formed as the decorative part 1 by using synthetic resin, for example, ABS resin or polycarbonate (PC) resin having high flowability and excellent transferability (in other words, followability to the shape of the molding surface) as black synthetic resin forming the substrate body 2 in order to realize a shape satisfying various conditional equations above. More specifically, the substrate body 2 is integrally molded by, for example, black synthetic resin including ABS resin or polycarbonate resin using a molding die according to a so-called heat and cool molding method or the like. In this case, the molding surface of the molding die for molding the substrate body 2 is provided with a part forming the respective members (the central disk portion 119, the boundary rising surface portion 120, the speedometer main scale portion 121, the speedometer auxiliary scale portion 122, the frame wall portion 123, the speedometer character display portion 124, the cylindrical end surface portion 125, the attachment portion 126, the fuel gauge circular plate portion 127, the fuel gauge scale portion 128, the boundary annular portion 129, the main scale 121a, the auxiliary scale 122a, the character string 124a, the character string 127a, the scale 128a or the mirror surface 6, and the like) of the dial plate 117 and a plurality of grooves corresponding to the pattern of the plurality of grooves 3 forming the radiation pattern 4 or the spinning pattern 5. The molding die forms a basic shape corresponding to the respective members of the dial plate 117 by using various processing machines, for example, an NC (Numerical Control) milling machine on the basis of processing information including shape information of the molding surface of the molding die. Here, when the molding surface of the molding die is provided with microscopic grooves corresponding to the plurality of grooves 3, microscopic grooves corresponding to the plurality of grooves 3 are formed by cutting in response to the molding surface using various cutting tools, for example, an end mill and a diamond tool regardless of etching, buffing, and polishing. The plurality of grooves 3 forming the radiation pattern 4 or the spinning pattern 5 are molded in the substrate body 2 in such a manner that the grooves formed on the molding surface of the molding die are transferred to the surface of the substrate body 2. As described above, since the substrate body 2 is molded by using ABS resin or polycarbonate resin which is synthetic resin having high flowability and excellent transferability according to the heat and cool molding method, it is possible to faithfully transfer desired shapes which are necessary for the respective members of the dial plate 117 or the mirror surface 6, the ridge lines 7, and the plurality of grooves 3 forming the radiation pattern 4 and the spinning pattern 5 and are formed on the molding surface of the molding die from the molding surface to the surface of the substrate body 2.

The decorative part 1 (the dial plate 117) described above includes the substrate body 2 which is molded by black synthetic resin and the mirror surface 6 which is formed on the surface of the substrate body 2. Here, the mirror surface 6 is formed so that the mirror surface roughness Ra becomes larger than 0 and equal to or smaller than 0.35 μm and the ratio of the wavelength Wsm in the case of the amplitude Wc of 1 which is captured by the ratio of the amplitude Wc corresponding to the average height of the undulation waveform and the wavelength Wsm corresponding to the average length thereof in the undulation curve in which the cutoff value from the surface shape is 250 μm becomes equal to or larger than 1:600 and equal to or smaller than 1:6000. More desirably, the mirror surface 6 is formed so that the ratio of the wavelength Wsm in the case of the amplitude Wc of 1 becomes equal to or larger than 1:1000 and equal to or smaller than 1:6000 and the mirror surface roughness Ra becomes larger than 0 and equal to or smaller than 0.35 μm. Most desirably, the mirror surface 6 is formed so that the ratio of the wavelength Wsm in the case of the amplitude Wc of 1 becomes equal to or larger than 1:1400 and equal to or smaller than 1:6000 and the mirror surface roughness Ra becomes larger than 0 and equal to or smaller than 0.30 μm. The vehicle display device 100 described above includes the display unit 101 which displays information on a vehicle and the decorative part 1 (the dial plate 117).

Thus, in the decorative part 1 (the dial plate 117) and the vehicle display device 100, since the substrate body 2 is molded by black synthetic resin and the mirror surface is formed so that the mirror surface roughness Ra and the ratio of the wavelength Wsm in the case of the amplitude Wc of 1 of the mirror surface 6 formed on the surface of the substrate body 2 satisfy any one of the conditional equations (1) to (3), it is possible to suppress the distortion of the image reflected on the black mirror surface 6 similarly to, for example, an image reflected on metal having a luxurious feeling and to realize a blurred feeling similarly to the image of the luxurious metal as the blurred feeling of the image reflected on the mirror surface 6. As a result, the decorative part 1 (the dial plate 117) and the vehicle display device 100 can realize a glossy feeling as fine piano black on the black mirror surface 6. Accordingly, the decorative part 1 and the vehicle display device 100 reduce a variation in quality by forming the substrate body 2 as the resin molded product and thus can realize a luxurious texture in black in the form of the resin molded product as described above. For example, the decorative part 1 and the vehicle display device 100 can suppress an increase in manufacturing cost compared to the case of machining the decorative parts 1 one by one. Accordingly, the decorative part 1 and the vehicle display device 100 can realize a decrease in cost. As a result, the decorative part 1 and the vehicle display device 100 can appropriately ensure a luxurious feeling given to a viewer in a configuration in which the surface of the resinous substrate body 2 is decorated. Here, as described above, the mirror surface 6 of the boundary rising surface portion 120 which is adjacent to the speedometer main scale portion 121 having the radiation pattern 4 and the mirror surfaces 6 of the frame wall portion 123, the cylindrical end surface portion 125, and the boundary annular portion 129 which are adjacent to the speedometer character display portion 124 and the fuel gauge scale portion 128 having the spinning pattern 5 can remarkably exhibit an effect of realizing a luxurious texture in black in the form of the resin molded product by the contrast of the mirror surfaces 6 having the radiation pattern 4, the spinning pattern 5, and the non-pattern.

Further, according to the decorative part 1 (the dial plate 117) and the vehicle display device 100 described above, the ridge line 7 is formed by the intersection of different surfaces of the surface of the substrate body 2 and the ridge line 7 is formed so that the curvature radius R of the corner 8 forming the vertex becomes larger than 0 and equal to or smaller than 28.0 μm. More desirably, the ridge line 7 is formed so that the curvature radius R of the corner 8 forming the vertex becomes larger than 0 and equal to or smaller than 10.0 μm. Thus, since the decorative part 1 (the dial plate 117) and the vehicle display device 100 are formed in a shape in which the curvature radius R of the corner 8 forming the vertex of the ridge line 7 formed by the intersection of different surfaces of the surface of the substrate body 2 satisfies any one of the conditional equations in the expressions (4) and (5), it is possible to realize a sharp feeling similarly to, for example, a groove formed by cutting metal having a luxurious feeling in the ridge line 7 of the black surface. Accordingly, the decorative part 1 and the vehicle display device 100 reduce a variation in quality by forming the substrate body 2 as the resin molded product and thus can realize a more luxurious texture in black in the form of the resin molded product as described above. As a result, the decorative part 1 and the vehicle display device 100 can further appropriately ensure a luxurious feeling given to a viewer in a configuration in which the surface of the resinous substrate body 2 is decorated.

Further, according to the decorative part 1 (the dial plate 117) and the vehicle display device 100 described above, the angle θ formed between different surfaces forming the ridge line 7c is larger than 90° (see FIG. 11). In this case, in the decorative part 1 (the dial plate 117) and the vehicle display device 100, the ridge line 7c which is formed in a shape in which the curvature radius R of the corner 8 satisfies any one of the conditional equations in the expressions (4) and (5) is applied to a part in which different surfaces intersect each other at an obtuse angle. For this reason, it is possible to further remarkably exhibit an effect of realizing a sharp feeling of the ridge line 7c of which sharpness is not easily recognized at an obtuse angle. As a result, the decorative part 1 and the vehicle display device 100 can further appropriately ensure a luxurious feeling given to a viewer in a configuration in which the surface of the resinous substrate body 2 is decorated.

Further, the decorative part 1 (the dial plate 117) and the vehicle display device 100 described above include the plurality of grooves 3 which are formed on the surface of the substrate body 2 and the plurality of grooves 3 are formed so that the width W between the bottom points 10 of the adjacent grooves 3 becomes larger than 0 and equal to or smaller than 3.0 μm and the height H of the vertex 9 between the adjacent grooves 3 at the lower side of the bottom points 10 of the adjacent grooves 3 becomes larger than 0 and equal to or smaller than 1.0 μm. More desirably, the plurality of grooves 3 are formed so that the width W becomes larger than 0 and equal to or smaller than 2.7 μm and the height H becomes larger than 0 and equal to or smaller than 0.35 μm. Thus, since the decorative part 1 (the dial plate 117) and the vehicle display device 100 are formed in a shape in which the width W and the height H satisfy any one of the conditional equations in the expressions (6) and (7) in the plurality of grooves 3 formed on the surface of the substrate body 2, it is possible to realize the width and the height (the depth) similarly to, for example, a groove formed by cutting metal having a luxurious feeling in the plurality of grooves 3 of the black surface. Accordingly, the decorative part 1 and the vehicle display device 100 reduce a variation in quality by forming the substrate body 2 as the resin molded product and thus can realize a more luxurious texture in black in the form of the resin molded product as described above. As a result, the decorative part 1 and the vehicle display device 100 can further appropriately ensure a luxurious feeling given to a viewer in a configuration in which the surface of the resinous substrate body 2 is decorated.

Further, according to the decorative part 1 (the dial plate 117) and the vehicle display device 100 described above, the plurality of grooves 3 are formed so that the distribution width of the width W becomes 1.2 μm or more and the distribution width of the height H becomes 0.3 μm or more. Thus, since the decorative part 1 (the dial plate 117) and the vehicle display device 100 can create a random feeling by the shapes of the plurality of grooves 3, it is possible to realize a texture, for example, similarly to metal having a luxurious feeling in the form of the resin molded product without forming an unnatural feeling in the radiation pattern 4 or the spinning pattern 5 formed by the plurality of grooves 3 and to further appropriately ensure a luxurious feeling given to a viewer.

Further, according to the decorative part 1 (the dial plate 117) and the vehicle display device 100 described above, the plurality of grooves 3 include the penetration groove 41 which extends in a linear shape and passes through the predetermined formation area 11 and the blocking groove 42 which extends in a linear shape and of which at least one end inside the formation area 11 is blocked. Thus, since the decorative part 1 (the dial plate 117) and the vehicle display device 100 can create a random feeling by forming a variation in shape of the plurality of grooves 3 using the penetration groove 41 and the blocking groove 42 as the plurality of grooves 3 forming the radiation pattern 4, the radiation pattern 4 formed by the plurality of grooves 3 is not unnatural. In this regard, it is possible to realize a texture, for example, similarly to metal having a luxurious feeling in the form of the resin molded product and thus further appropriately ensure a luxurious feeling given to a viewer.

Further, according to the decorative part 1 (the dial plate 117) and the vehicle display device 100 described above, the plurality of grooves 3 include the main curved groove 43 which is formed in a circular arc or annular shape and extends so that the sum of the center angle becomes equal to or larger than 360° and the auxiliary curved groove 44 which is formed in a circular arc shape and extends so that the sum of the center angle becomes smaller than 360°. Thus, since the decorative part 1 (the dial plate 117) and the vehicle display device 100 can create a random feeling by forming a variation in shape of the plurality of grooves 3 in such a manner that the main curved groove 43 and the auxiliary curved groove 44 are provided as the plurality of grooves 3 forming the spinning pattern 5, the spinning pattern 5 formed by the plurality of grooves 3 is not unnatural. In this regard, it is possible to realize a texture, for example, similarly to metal having a luxurious feeling in the form of the resin molded product and thus further appropriately ensure a luxurious feeling given to a viewer.

Further, the decorative part 1 (the dial plate 117) and the vehicle display device 100 described above include the plurality of grooves 3 which are formed on the surface of the substrate body 2 and the plurality of grooves 3 are formed so that the curvature radius R1 of the corner 12 forming the vertex between the adjacent grooves 3 becomes larger than 0 and equal to or smaller than 38.0 μm. More desirably, the plurality of grooves 3 are formed so that the curvature radius R1 of the corner 12 forming the vertex between the adjacent grooves 3 becomes larger than 0 and equal to or smaller than 36.0 μm. Most desirably, the plurality of grooves 3 are formed so that the curvature radius R1 of the corner 12 forming the vertex between the adjacent grooves 3 becomes larger than 0 and equal to or smaller than 33.0 μm. Thus, since the decorative part 1 (the dial plate 117) and the vehicle display device 100 are formed in a shape in which the curvature radius R1 of the corner 12 forming the vertex of the plurality of grooves 3 formed on the surface of the substrate body 2 satisfies any one of the conditional equations in the expressions (8) to (10), it is possible to realize a sharp feeling similarly to, for example, a groove formed by cutting metal having a luxurious feeling in the plurality of grooves 3 of the black surface. Accordingly, the decorative part 1 and the vehicle display device 100 reduce a variation in quality by forming the substrate body 2 as the resin molded product and thus can realize a more luxurious texture in black by the resin molded product. As a result, the decorative part 1 and the vehicle display device 100 can further appropriately ensure a luxurious feeling given to a viewer in a configuration in which the surface of the resinous substrate body 2 is decorated.

Further, according to the decorative part 1 (the dial plate 117) and the vehicle display device 100 described above, the substrate body 2 is molded by ABS resin or polycarbonate resin according to, for example, a so-called heat and cool molding method or the like. Thus, the decorative part 1 and the vehicle display device 100 can ensure satisfactory transferability at the substrate body 2 forming the decorative part 1. That is, since the substrate body 2 is molded by ABS resin or polycarbonate resin according to a heat and cool molding method or the like, it is possible to faithfully transfer desired shapes which are necessary for the respective members of the dial plate 117 or the mirror surface 6, the ridge line 7, and the plurality of grooves 3 forming the radiation pattern 4 and the spinning pattern 5 and are formed on the molding surface of the molding die from the molding surface to the surface of the substrate body 2. In this regard, the decorative part 1 and the vehicle display device 100 can further appropriately ensure a luxurious feeling given to a viewer in a configuration in which the surface of the resinous substrate body 2 is decorated.

Additionally, the decorative part for the vehicle display device and the vehicle display device according to the embodiment of the present invention are not limited to the embodiment and can be modified into various forms within the scope of claims.

In the description above, a case has been described in which the decorative part 1 is applied to the dial plate 117 assembled to the speedometer 102, the fuel gauge 103, the tachometer 104, the water temperature gauge 105, and the like, but the present invention is not limited thereto. The decorative part may be applied to the other decorative members which are exposed to the front surface side in the depth direction of the vehicle display device 100 and may enter a viewing angle of a passenger including a driver. The decorative part 1 may be applied to an annular decorative member (the annular member) provided in the periphery of the facing member 112 or the speedometer 102, the fuel gauge 103, the tachometer 104, the water temperature gauge 105, and the like.

In the description above, an example of the dial plate 117 has been described in which the radiation pattern 4 is formed on the surfaces of the speedometer main scale portion 121 and the fuel gauge circular plate portion 127 and the spinning pattern 5 is formed on the surfaces of the speedometer character display portion 124 and the fuel gauge scale portion 128, but the present invention is not limited thereto. The dial plate 117 may have a pattern other than the radiation pattern 4 and the spinning pattern 5 by the plurality of grooves 3. The dial plate 117 may have, for example, a hairline pattern with vertical stripes, a hairline pattern with horizontal stripes, or a pattern obtained by intersecting vertical stripes and horizontal stripes by the use of the plurality of grooves 3.

In the description above, a case has been described in which ABS resin or polycarbonate resin is used as the synthetic resin forming the substrate body 2, but the present invention is not limited thereto. The substrate body 2 may be formed of, for example, other resins having high transferability.

In the description above, a case has been described in which the "3D measurement laser microscope LEXT OLS 4000 manufactured by Olympus Corporation" is used as the measurement device for measuring the amplitude Wc, the wavelength Wsm, and the mirror surface roughness Ra, but the present invention is not limited thereto. For example, other measurement devices may be used. In this case, the predetermined measurement condition which is set in advance to measure the amplitude Wc, the wavelength Wsm, and the mirror surface roughness Ra may be set as described above.

Similarly, in the description above, a case has been described in which the "3D measurement laser microscope LEXT OLS 4000 manufactured by Olympus Corporation" is used as the measurement device for measuring the curvature radius R of the corner 8 forming the vertex of the ridge line 7, the measurement device for measuring the width W and the height H, and the measurement device for measuring the curvature radius R1 of the corner 12 forming the vertex between the adjacent grooves 3, but the present invention is not limited thereto. For example, other measurement devices may be used. In this case, the predetermined measurement condition which is set in advance to measure the curvature radius R of the corner 8 forming the vertex of the ridge line 7, the width W, the height H, and the curvature radius R1 of the corner 12 forming the vertex between the adjacent grooves 3 may be set as described above.

Reference Example

FIGS. 18, 19, 20, and 21 are diagrams illustrating a result of a sensory evaluation test of a dial plate according to a reference example. Hereinafter, the sensory evaluation test of the reference example of the dial plate 117 formed as the decorative part 1 will be described with reference to FIGS. 18, 19, 20, and 21.

Here, the dial plate which is formed as the decorative part according to the reference example (the first to tenth reference examples) to be described below is different from the decorative part 1 (the dial plate 117) according to the above-described embodiment in that a metallic thin film which is formed of metal and adheres to the surface of the substrate body (corresponding to the substrate body 2) is further provided. Then, the dial plate which is formed as the decorative part according to the reference example includes a mirror surface (corresponding to the mirror surface 6) which is formed on a surface of a metallic thin film in response to a shape of a surface of a substrate body, a ridge line (corresponding to the ridge line 7) which is formed by an intersection of different surfaces of the surface of the metallic thin film in response to the shape of the surface of the substrate body, a plurality of grooves (corresponding to the groove 3) which are formed on the surface of the metallic thin film in response to the shape of the surface of the substrate body, and the like. In this case, in the dial plate which is formed as the decorative part according to the reference example, for example, the metallic thin film includes titanium. Accordingly, a combination of the substrate body and the metallic thin film is formed as a combination capable of ensuring satisfactory transferability of the substrate body forming the decorative part, workability of the metallic thin film forming the decorative part, shape followability obtained by a decrease in thickness of the metallic film, and satisfactory adhesiveness between the substrate body and the metallic thin film. That is, since the substrate body according to the reference example is molded by using cycloolefin polymer resin, it is possible to faithfully transfer desired shapes which are necessary for the respective members of the dial plate or the mirror surface and the plurality of grooves forming the radiation pattern and the spinning pattern and are formed on the molding surface of the molding die from the molding surface to the surface of the substrate body. Further, since the metallic thin film according to the reference example is formed by titanium, it is possible to form the metallic thin film on the surface of the substrate body by sputtering and thus to relatively decrease the film thickness. Accordingly, it is possible to form the plurality of grooves forming the radiation pattern and the spinning pattern without burying the plurality of grooves formed on the surface of the substrate body. Then, since the substrate body and the metallic thin film according to the reference example can sufficiently ensure adhesiveness, it is possible to suppress the metallic thin film from being separated from the substrate body. The "first to twelfth comparative examples" to be described below also have the same configurations as that of the reference example.

As for the sensory evaluation test having a result illustrated in FIG. 18, in the reference example of the dial plate 117 formed as the decorative part 1 according to the above-described embodiment, the mirror surface was formed so that the ratio of the wavelength Wsm in the case of the amplitude Wc of 1 and the mirror surface roughness Ra satisfied any one of the conditional equations (1) to (3). Regarding the "first reference example", the mirror surface is formed to satisfy the conditional equation (1) so that the ratio of the wavelength Wsm in the case of the amplitude Wc of 1 becomes 1:659 and the mirror surface roughness Ra becomes 0.336 µm. Regarding the "second reference example", the mirror surface is formed to satisfy the conditional equations (1) to (3) so that the ratio of the wavelength Wsm in the case of the amplitude Wc of 1 becomes 1:1460 to 2920 and the mirror surface roughness Ra becomes 0.296 µm. Meanwhile, in the "first comparative example", the "second comparative example", the "third comparative example", and the "fourth comparative example", the mirror surface is formed so that the ratio of the wavelength Wsm in the case of the amplitude Wc of 1 and the mirror surface roughness Ra do not satisfy all conditional equations (1) to (3). Regarding the "first comparative example", the mirror surface is formed so that the ratio of the wavelength Wsm in the case of the amplitude Wc of 1 becomes 1:181 and the mirror surface roughness Ra becomes 1.714 µm. Regarding the "second comparative example", the mirror surface is formed so that the ratio of the wavelength Wsm in the case of the amplitude Wc of 1 becomes 1:482 and the mirror surface roughness Ra becomes 1.271 µm. Regarding the "third comparative example", the mirror surface is formed so that the ratio of the wavelength Wsm in the case of the amplitude Wc of 1 becomes 1:524 and the mirror surface roughness Ra becomes 0.696 µm. Regarding the "fourth comparative example", the mirror surface is formed so that the ratio of the wavelength Wsm in the case of the amplitude Wc of 1 becomes 1:556 and the mirror surface roughness Ra becomes 0.368 μm. In the "first reference example", the "second reference example", the "first comparative example", the "second comparative example", the "third comparative example", and the "fourth comparative example", as described above, cycloolefin polymer resin is used as the synthetic resin forming the substrate body, titanium is used as the metal forming the metallic thin film, and the metallic thin film is formed on the surface of the substrate body by sputtering. In the "first reference example", the "second reference example", the "first comparative example", the "second comparative example", the "third comparative example", and the "fourth comparative example", the amplitude We and the wavelength Wsm were the measurement values obtained by <step 1-1> to <step 1-8> using the "3D measurement laser microscope LEXT OLS 4000 manufactured by Olympus Corporation". In the "first reference example", the "second reference example", the "first comparative example", the "second comparative example", the "third comparative example", and the "fourth comparative example", the mirror surface roughness Ra was the measurement value obtained by <step 2-1> to <step 2-7> using the "3D measurement laser microscope LEXT OLS 4000 manufactured by Olympus Corporation". Additionally, in the dial plate measured by the same configuration using the present metal, the mirror surface was manufactured by cutting and polishing and the mirror surface was measured by the same method. However, in this case, the ratio of the wavelength Wsm in the case of the amplitude We of 1 was "1:2560 to 5850" and the mirror surface roughness Ra was "0.259 μm".

The sensory evaluation test having a result illustrated in FIG. 18 was performed as below by using the "first reference example", the "second reference example", the "first comparative example", the "second comparative example", the "third comparative example", and the "fourth comparative example" as the evaluation targets. That is, the evaluation target and the present metal were subjected to the sensory evaluation test for a luxurious feeling in response to the metallic texture of the evaluation target based on the experience of the evaluator in each of a case (A-1) in which the evaluation target and the present metal were disposed at predetermined positions inside a trial product of the vehicle display device 100 illustrated in FIG. 1 in an indoor place without external light, a case (A-2) in which the evaluation target and the present metal were disposed at predetermined positions inside a trial product of the vehicle display device 100 illustrated in FIG. 1 in an indoor place with external light, a case (B-1) in which the evaluation target and the present metal were disposed inside a box with an acrylic ceiling (which was similar to an exhibition casing) in an indoor place without external light and the periphery other than the evaluation target was covered by a black cloth, and a case (B-2) in which the evaluation target and the present metal were disposed inside a box with an acrylic ceiling in an indoor place with external light and the periphery other than the evaluation target was covered by a black cloth. In other words, the metallic texture of the evaluation target was diagnosed by the sensory evaluation test for a luxurious feeling of the evaluation target. Finally, a total evaluation was performed in consideration of all cases (A-1), (A-2), (B-1), and (B-2). As the evaluation value, a value in which a luxurious feeling could be obtained without any unnatural feeling compared to the present metal was set to "100" and a value in which a sufficient luxurious feeling could not be obtained due to an unnatural feeling compared to the present metal was set to a value smaller than "100". As the evaluation value, a luxurious feeling becomes sufficient as the evaluation value becomes larger than "100" and a luxurious feeling becomes insufficient as the evaluation value becomes smaller than "100". The evaluator was a designer of the vehicle display device (the meter) and the evaluation value was an average value of the evaluation values of five evaluators. The sensory evaluation test was performed on each of the evaluation targets.

As a result of the sensory evaluation test, as obvious from FIG. 18, the evaluation value of the "first comparative example" was "70", the evaluation value of the "second comparative example" was "80", the evaluation value of the "third comparative example" was "90", and the evaluation value of the "fourth comparative example" was "90". As a result, a luxurious feeling was not sufficient and natural compared to metal. In contrast, the evaluation value of the "first reference example" was "100" and the evaluation value of the "second reference example" was "120". As a result, it is obvious that a sufficient luxurious feeling can be obtained without any unnatural feeling compared to the present metal. Further, in the "first reference example" and the "second reference example", the distortion of the reflected image decreases as the ratio of the wavelength Wsm in the case of the amplitude We of 1 increases and the contour of the reflected image becomes clear as the mirror surface roughness Ra decreases. Accordingly, a luxurious feeling obviously increases and thus the "second reference example" has the highest luxurious feeling. As described above, in the "first reference example" and the "second reference example", it is obvious that a luxurious feeling given to a viewer can be appropriately ensured in a configuration in which the metallic thin film is formed on the surface of the resinous substrate body. In view of this result, in the dial plate 117 formed as the decorative part 1 of the embodiment, since the mirror surface 6 is formed so that the ratio of the wavelength Wsm in the case of the amplitude We of 1 and the mirror surface roughness Ra satisfy any one of the conditional equations (1) to (3) similarly to the "first reference example" and the "second reference example", it is possible to appropriately ensure a luxurious feeling given to a viewer similarly to the reference examples.

As for the sensory evaluation test having a result illustrated in FIG. 19, in the reference example of the dial plate 117 formed as the decorative part 1 according to the above-described embodiment, the mirror surface was formed so that the curvature radius R of the corner forming the vertex of the ridge line satisfies any one of the conditional equations in the expressions (4) and (5). Regarding the "third reference example", the ridge line is formed to satisfy the expression (4) so that the curvature radius R of the corner forming the vertex of each of all ridge lines becomes 27.6 μm or less. Regarding the "fourth reference example", the ridge line is formed to satisfy the expressions (4) and (5) so that the curvature radius R of the corner forming the vertex of each of all ridge lines becomes 6.7 μm or less. Meanwhile, in the "fifth comparative example", the "sixth comparative example", the "seventh comparative example", and the "eighth comparative example", the plurality of grooves are formed so that the curvature radius R of the corner forming the vertex of the ridge line does not satisfy all conditional equations in the expressions (4) and (5). Regarding the "fifth comparative example", the ridge line is formed so that the curvature radius R of the corner forming the vertex of each of all ridge lines becomes 262.5 μm or less and includes the curvature radius R larger than at least 28.0 μm. Regarding the "sixth comparative example", the ridge line is formed so that the curvature radius R of the corner forming the vertex of each of all ridge lines becomes 37.0 µm or less and includes the curvature radius R larger than at least 28.0 µm. Regarding the "seventh comparative example", the ridge line is formed so that the curvature radius R of the corner forming the vertex of each of all ridge lines becomes 36.7 µm or less and includes the curvature radius R larger than at least 28.0 µm. Regarding the "eighth comparative example", the ridge line is formed so that the curvature radius R of the corner forming the vertex of each of all ridge lines becomes 34.0 µm or less and includes the curvature radius R larger than at least 28.0 µm. In the "third reference example", the "fourth reference example", the "fifth comparative example", the "sixth comparative example", the "seventh comparative example", and the "eighth comparative example", as described above, cycloolefin polymer resin is used as the synthetic resin forming the substrate body, titanium is used as the metal forming the metallic thin film, and the metallic thin film is formed on the surface of the substrate body by sputtering. In the "third reference example", the "fourth reference example", the "fifth comparative example", the "sixth comparative example", the "seventh comparative example", and the "eighth comparative example", the curvature radius R of each corner was the measurement value obtained by <step 3-1> to <step 3-4> using the "3D measurement laser microscope LEXT OLS 4000 manufactured by Olympus Corporation". Additionally, in the dial plate formed by the same configuration using the present metal, the ridge line was formed by cutting and the corner forming the vertex of the ridge line was measured by the same method. However, in this case, the curvature radius R was "0".

The sensory evaluation test having a result illustrated in FIG. 19 was performed as in the sensory evaluation test having a result illustrated in FIG. 18 by using the "third reference example", the "fourth reference example", the "fifth comparative example", the "sixth comparative example", the "seventh comparative example", and the "eighth comparative example" as the evaluation targets.

As a result of the sensory evaluation test, as obvious from FIG. 19, the evaluation value of the "fifth comparative example" was "80", the evaluation value of the "sixth comparative example" was "90", the evaluation value of the "seventh comparative example" was "90", and the evaluation value of the "eighth comparative example" was "90". As a result, a luxurious feeling was not sufficient and natural compared to metal. In contrast, the evaluation value of the "third reference example" was "100" and the evaluation value of the "fourth reference example" was "130". As a result, it is obvious that a sufficient luxurious feeling can be obtained without any unnatural feeling compared to the present metal. Further, even in the "third reference example" and the "fourth reference example", it is obvious that a luxurious feeling increases as the curvature radius R of the corner forming the vertex of the ridge line decreases and a luxurious feeling is high in the "fourth reference example". As described above, in the "third reference example" and the "fourth reference example", it is obvious that a luxurious feeling given to a viewer can be appropriately ensured in a configuration in which the metallic thin film is formed on the surface of the resinous substrate body. In view of this result, in the dial plate 117 formed as the decorative part 1 of the embodiment, since the plurality of grooves are formed so that the curvature radius R of the corner 8 forming the vertex of the ridge line 7 satisfies any one of the conditional equations in the expressions (4) and (5) similarly to the "third reference example" and the "fourth reference example", it is possible to appropriately ensure a luxurious feeling given to a viewer similarly to the reference examples.

As for the sensory evaluation test having a result illustrated in FIG. 20, in the reference example of the dial plate 117 formed as the decorative part 1 according to the above-described embodiment, the mirror surface was formed so that the width W and the height H of the groove satisfied any one of the conditional equations in the expressions (6) and (7). Regarding the "fifth reference example", the plurality of grooves are formed to satisfy the expressions (6) and (7) so that all widths W become equal to or larger than 0.331 and equal to or smaller than 2.653 µm and all heights H become equal to or larger than 0.007 and equal to or smaller than 0.316 µm. Regarding the "sixth reference example", the plurality of grooves are formed to satisfy the expressions (6) and (7) so that all widths W become equal to or larger than 0.280 and equal to or smaller than 1.439 µm and all heights H become equal to or larger than 0.006 and equal to or smaller than 0.310 µm. Meanwhile, in the "ninth comparative example", the "tenth comparative example", and the "eleventh comparative example", the width W and the height H dot not satisfy all conditional equations in the expressions (6) and (7). Regarding the "ninth comparative example", the plurality of grooves are formed so as to include the width W and the height H not satisfying at least the expressions (6) and (7) while all widths W become equal to or larger than 43.84 and equal to or smaller than 199.3 µm and all heights H become equal to or larger than 10.17 and equal to or smaller than 18.07 µm. Regarding the "tenth comparative example", the plurality of grooves are formed so as to include the width W and the height H not satisfying at least the expressions (6) and (7) while all widths W become larger than 0 and equal to or smaller than 82.34 µm and all heights H become larger than 0 and equal to or smaller than 1.053 µm. Regarding the "eleventh comparative example", the plurality of grooves are formed so as to include the width W and the height H not satisfying at least the expressions (6) and (7) while all widths W become larger than 2.853 and equal to or smaller than 75.93 µm and all heights H become larger than 0.225 and equal to or smaller than 1.195 µm. In the "fifth reference example", the "sixth reference example", the "ninth comparative example", the "tenth comparative example", and the "eleventh comparative example", as described above, cycloolefin polymer resin is used as the synthetic resin forming the substrate body, titanium is used as the metal forming the metallic thin film, and the metallic thin film is formed on the surface of the substrate body by sputtering. In the "fifth reference example", the "sixth reference example", the "ninth comparative example", the "tenth comparative example", and the "eleventh comparative example", the widths W and the heights H were the measurement values obtained by <step 4-1> to <step 4-4> using the "3D measurement laser microscope LEXT OLS 4000 manufactured by Olympus Corporation". Additionally, in the dial plate formed by the same configuration using the present metal, the plurality of grooves forming the radiation pattern and the spinning pattern were formed by cutting and the widths W and the heights H of the present metal were measured by the same method. However, in this case, the width W was equal to or larger than 0.337 and equal to or smaller than 1.562 µm and the height H was equal to or larger than 0.007 and equal to or smaller than 0.611 µm.

The sensory evaluation test having a result illustrated in FIG. 20 was performed as in the sensory evaluation test having a result illustrated in FIG. 18 by using the "fifth reference example", the "sixth reference example", the "ninth comparative example", the "tenth comparative example", and the "eleventh comparative example" as the evaluation targets.

As a result of the sensory evaluation test, as obvious from FIG. 20, the evaluation value of the "ninth comparative example" was "80", the evaluation value of the "tenth comparative example" was "85", and the evaluation value of the "eleventh comparative example" was "90". As a result, a luxurious feeling was not sufficient and natural compared to metal. In contrast, the evaluation value of the "fifth reference example" was "110" and the evaluation value of the "sixth reference example" was "120". As a result, it is obvious that a sufficient luxurious feeling can be obtained without any unnatural feeling compared to the present metal. Further, even in the "fifth reference example" and the "sixth reference example", it is obvious that a luxurious feeling increases as the width W and the height H decrease within a visible range and a luxurious feeling is high in the "sixth reference example". As described above, in the "fifth reference example" and the "sixth reference example", it is obvious that a luxurious feeling given to a viewer can be appropriately ensured in a configuration in which the metallic thin film is formed on the surface of the resinous substrate body. In view of this result, in the dial plate 117 formed as the decorative part 1 of the embodiment, since the plurality of grooves 3 are formed on the surface of the substrate body 2 so that the width W and the height H satisfy any one of the conditional equations in the expressions (6) and (7) similarly to the "fifth reference example" and the "sixth reference example", it is possible to appropriately ensure a luxurious feeling given to a viewer similarly to the reference examples.

As for the sensory evaluation test having a result illustrated in FIG. 21, in the reference example of the dial plate 117 formed as the decorative part 1 according to the above-described embodiment, the mirror surface was formed so that the curvature radius R1 of the corner forming the vertex of the plurality of grooves satisfied any one of the conditional equations in the expressions (8) to (10). Regarding the "seventh reference example", the plurality of grooves are formed to satisfy the expression (8) so that the curvature radius R1 of each corner becomes 38.0 µm or less. Regarding the "eighth reference example", the plurality of grooves are formed to satisfy the expressions (8) and (9) so that the curvature radius R1 of each corner 12 becomes 36.0 µm or less. Regarding the "ninth reference example", the plurality of grooves are formed to satisfy the expressions (8) to (10) so that the curvature radius R1 of each corner 12 becomes 33.0 µm or less. Regarding the "tenth reference example", the plurality of grooves are formed to satisfy all expressions (8) to (10) so that the curvature radius R1 of each corner 12 becomes 31.5 µm or less. Meanwhile, in the "twelfth comparative example", the plurality of grooves are formed so that the curvature radius R1 of the corner does not satisfy all conditional equations in the expressions (8) to (10) and the plurality of grooves are formed so that the curvature radius R1 of each corner becomes 44.0 µm or less and includes the curvature radius R1 larger than at least 38.0 µm. In the "seventh reference example", the "eighth reference example", the "ninth reference example", the "tenth reference example", and the "twelfth comparative example", as described above, cycloolefin polymer resin is used as the synthetic resin forming the substrate body, titanium is used as the metal forming the metallic thin film, and the metallic thin film is formed on the surface of the substrate body by sputtering. In the "seventh reference example", the "eighth reference example", the "ninth reference example", the "tenth reference example", and the "twelfth comparative example", the curvature radius R1 of each corner was the measurement value obtained by <step 3-1> to <step 3-4> using the "3D measurement laser microscope LEXT OLS 4000 manufactured by Olympus Corporation". Additionally, in the dial plate formed by the same configuration using the present metal, the plurality of grooves forming the radiation pattern and the spinning pattern were formed by cutting and the groove was measured by the same method. However, in this case, the curvature radius R1 was "0".

The sensory evaluation test having a result illustrated in FIG. 21 was performed as in the sensory evaluation test having a result illustrated in FIG. 18 by using the "seventh reference example", the "eighth reference example", the "ninth reference example", the "tenth reference example", and the "twelfth comparative example" as the evaluation targets.

As a result of the sensory evaluation test, as obvious from FIG. 21, the evaluation value of the "twelfth comparative example" was "90". As a result, a luxurious feeling was not sufficient and natural compared to metal. In contrast, the evaluation value of the "seventh reference example" was "100", the evaluation value of the "eighth reference example" was "110", the evaluation value of the "ninth reference example" was "120", and the evaluation value of the "tenth reference example" was "150". As a result, it is obvious that a sufficient luxurious feeling can be obtained without any unnatural feeling compared to the present metal. Further, even in the "seventh reference example", the "eighth reference example", the "ninth reference example", and the "tenth reference example", it is obvious that a luxurious feeling increases as the curvature radius R1 of the corner decreases and the "tenth reference example" satisfying the following expression (11) has the highest luxurious feeling.

$$0 < R1 \leq 31.5 \ \mu m \qquad (11)$$

As described above, in the "seventh reference example", the "eighth reference example", the "ninth reference example", and the "tenth reference example", it is obvious that a luxurious feeling given to a viewer can be appropriately ensured in a configuration in which the metallic thin film is formed on the surface of the resinous substrate body. In view of this result, in the dial plate 117 formed as the decorative part 1 of the embodiment, since the plurality of grooves are formed so that the curvature radius R1 of the corner 12 forming the vertex of the plurality of grooves 3 satisfies any one of the conditional equations in the expressions (8) to (10) similarly to the "seventh reference example", the "eighth reference example", the "ninth reference example", and the "tenth reference example", it is possible to appropriately ensure a luxurious feeling given to a viewer similarly to the reference examples.

In the decorative part for the vehicle display device and the vehicle display device according to the embodiment, since the substrate body is molded by black synthetic resin and the mirror surface is formed so that the mirror surface roughness becomes larger than 0 and equal to or smaller than 0.35 µm and the ratio of the wavelength becomes equal to or larger than 1:600 and equal to or smaller than 1:6000 when the amplitude of the mirror surface formed on the surface of the substrate body is set to 1, it is possible to suppress the distortion of the image reflected on the black mirror surface similarly to, for example, an image reflected on metal having a luxurious feeling and to realize a blurred feeling similarly to the image of the luxurious metal as a blurred feeling of the image reflected on the mirror surface. As a result, the decorative part for the vehicle display device and the vehicle display device can realize a glossy feeling as so-called fine piano black on the black mirror surface. Accordingly, the decorative part for the vehicle display device and the vehicle display device reduce a variation in quality by forming the substrate body as a resin molded product and thus can realize a luxurious texture in black in the form of the resin molded product as described above. As a result, the decorative part for the vehicle display device and the vehicle display device have an effect that a luxurious feeling given to a viewer is appropriately ensured in a configuration in which the surface of the resinous substrate body is decorated.

Although the present invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A decorative part for a vehicle display device, comprising:
    a substrate body that is molded by black synthetic resin; and
    a mirror surface that is formed on a surface of the substrate body, wherein
    the mirror surface is formed so that mirror surface roughness becomes larger than 0 and equal to or smaller than 0.35 μm and a ratio of a wavelength becomes equal to or larger than 1:600 and equal to or smaller than 1:6000 in the case of an amplitude of 1, the amplitude being captured by a ratio of the amplitude corresponding to an average height of an undulation waveform and the wavelength corresponding to an average length of the undulation waveform in an undulation curve in which a cutoff value from a surface shape is 250 μm.

2. The decorative part for the vehicle display device according to claim 1, further comprising:
    a ridge line that is formed by an intersection of different surfaces of the surface of the substrate body, wherein
    the ridge line is formed so that a curvature radius of a corner forming a vertex becomes larger than 0 and equal to or smaller than 28.0 μm.

3. A decorative part for a vehicle display device, comprising:
    a substrate body that is molded by black synthetic resin;
    a mirror surface that is formed on a surface of the substrate body; and
    a plurality of grooves that are formed on the surface of the substrate body, wherein
    the mirror surface is formed so that mirror surface roughness becomes larger than 0 and equal to or smaller than 0.35 μm and a ratio of a wavelength becomes equal to or larger than 1:600 and equal to or smaller than 1:6000 in the case of an amplitude of 1, the amplitude being captured by a ratio of the amplitude corresponding to an average height of an undulation waveform and the wavelength corresponding to an average length of the undulation waveform in an undulation curve in which a cutoff value from a surface shape is 250 μm, and
    the plurality of grooves are formed so that a width between bottom points of the adjacent grooves becomes larger than 0 and equal to or smaller than 3.0 μm and a height of a vertex between the adjacent grooves at a lower side of the bottom points of the adjacent grooves becomes larger than 0 and equal to or smaller than 1.0 μm.

4. The decorative part for the vehicle display device according to claim 3, further comprising:
    a ridge line that is formed by an intersection of different surfaces of the surface of the substrate body, wherein
    the ridge line is formed so that a curvature radius of a corner forming a vertex becomes larger than 0 and equal to or smaller than 28.0 μm.

5. The decorative part for the vehicle display device according to claim 3, wherein
    the plurality of grooves are formed so that a curvature radius of a corner forming the vertex between the adjacent grooves becomes larger than 0 and equal to or smaller than 38.0 μm.

6. A vehicle display device comprising:
    a display unit that displays information on a vehicle; and
    a decorative part for the vehicle display device that includes a substrate body molded by black synthetic resin and a mirror surface formed on a surface of the substrate body, wherein
    the mirror surface is formed so that mirror surface roughness becomes larger than 0 and equal to or smaller than 0.35 μm and a ratio of a wavelength becomes equal to or larger than 1:600 and equal to or smaller than 1:6000 in the case of an amplitude of 1, the amplitude being captured by a ratio of the amplitude corresponding to an average height of an undulation waveform and the wavelength corresponding to an average length of the undulation waveform in an undulation curve in which a cutoff value from a surface shape is 250 μm.

\* \* \* \* \*